(12) United States Patent
Tyan et al.

(10) Patent No.: US 10,279,842 B2
(45) Date of Patent: May 7, 2019

(54) TWENTY-EIGHT-CORNERED STRENGTHENING MEMBER FOR VEHICLES

(71) Applicant: FORD GLOBAL TECHNOLOGIES, LLC, Dearborn, MI (US)

(72) Inventors: Tau Tyan, Northville, MI (US); Yu-Kan Hu, Ypsilanti, MI (US); Leonard Anthony Shaner, New Baltimore, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 92 days.

(21) Appl. No.: 15/251,029

(22) Filed: Aug. 30, 2016

(65) Prior Publication Data
US 2018/0057063 A1  Mar. 1, 2018

(51) Int. Cl.
*B62D 21/00* (2006.01)
*B62D 25/00* (2006.01)
*F16F 7/12* (2006.01)

(52) U.S. Cl.
CPC ............ *B62D 25/00* (2013.01); *B62D 21/00* (2013.01); *F16F 7/12* (2013.01)

(58) Field of Classification Search
CPC ............ B62D 25/00; B62D 21/00; F16F 7/12
USPC ....................................................... 293/133
See application file for complete search history.

(56) References Cited

U.S. PATENT DOCUMENTS

| | | | |
|---|---|---|---|
| 2,205,893 A | 6/1840 | Unger | |
| 1,951,292 A | 3/1934 | Cahill | |
| 2,340,003 A | 1/1944 | McDermot | |
| 2,837,347 A | 6/1958 | Barenyi | |
| 2,856,226 A | 10/1958 | Purdy | |
| 3,092,222 A | 6/1963 | Heinle | |
| 3,209,432 A | 10/1965 | Cape | |
| 3,366,530 A | 1/1968 | Kodich Momir | |
| 3,412,628 A | 11/1968 | De Gain | |
| 3,930,658 A | 1/1976 | Howe et al. | |
| 3,964,527 A | 6/1976 | Zwart | |
| 4,018,055 A | 4/1977 | Clercq | |
| 4,021,983 A | 5/1977 | Kirk, Jr. | |
| 4,029,350 A | 6/1977 | Goupy et al. | |
| 4,056,878 A | 11/1977 | Woodley | |
| 4,227,593 A | 10/1980 | Bricmont et al. | |
| 4,249,976 A | 2/1981 | Hudson | |
| 4,352,484 A | 10/1982 | Gertz et al. | |
| 4,364,216 A | 12/1982 | Koller | |
| 4,667,530 A | 5/1987 | Mettler et al. | |

(Continued)

FOREIGN PATENT DOCUMENTS

| CN | 104443039 A | 3/2015 |
|---|---|---|
| CN | 104763772 A | 7/2015 |

(Continued)

OTHER PUBLICATIONS

Non-Final Office Action dated Jun. 12, 2018 from U.S. Appl. No. 15/251,099.

(Continued)

*Primary Examiner* — Pinel E Romain
(74) *Attorney, Agent, or Firm* — Jones Robb, PLLC; Vichit Chea

(57) ABSTRACT

A strengthening member for a motor vehicle and a vehicle including a strengthening member are provided. The strengthening member can have twenty-eight sides arranged to create twenty internal angles and eight external angles.

27 Claims, 23 Drawing Sheets

(56) References Cited

U.S. PATENT DOCUMENTS

| | | |
|---|---|---|
| 4,702,515 A | 10/1987 | Kato et al. |
| 5,069,318 A | 12/1991 | Kulesha et al. |
| 5,100,730 A | 3/1992 | Lambers |
| 5,242,735 A | 9/1993 | Blankenburg et al. |
| 5,271,204 A | 12/1993 | Wolf et al. |
| 5,431,445 A | 7/1995 | Wheatley |
| 5,480,189 A | 2/1996 | Schechter |
| 5,618,633 A | 4/1997 | Swanson et al. |
| 5,729,463 A | 3/1998 | Koenig et al. |
| 5,913,565 A | 6/1999 | Watanabe |
| 6,068,330 A | 5/2000 | Kasuga et al. |
| 6,179,355 B1 | 1/2001 | Chou et al. |
| 6,371,540 B1 | 4/2002 | Campanella et al. |
| 6,523,576 B2 | 2/2003 | Imaeda et al. |
| 6,588,830 B1 | 7/2003 | Schmidt et al. |
| 6,635,202 B1 | 10/2003 | Bugg et al. |
| 6,705,653 B2 | 3/2004 | Gotanda et al. |
| 6,752,451 B2 | 6/2004 | Sakamoto et al. |
| 6,799,794 B2 | 10/2004 | Mochidome et al. |
| 6,893,065 B2 | 3/2005 | Seksaria et al. |
| 6,959,894 B2 | 11/2005 | Hayashi |
| 7,044,515 B2 | 5/2006 | Mooijman et al. |
| 7,160,621 B2 | 1/2007 | Chaudhari et al. |
| 7,252,314 B2 | 8/2007 | Tamura et al. |
| 7,264,274 B2 | 9/2007 | Ridgway |
| 7,303,219 B2 | 12/2007 | Trabant et al. |
| 7,350,851 B2 | 4/2008 | Barvosa-Carter et al. |
| 7,357,445 B2 | 4/2008 | Gross et al. |
| 7,407,219 B2 | 8/2008 | Glasgow et al. |
| 7,445,097 B2 | 11/2008 | Tamura et al. |
| 7,678,440 B1 | 3/2010 | McKnight et al. |
| 7,896,411 B2 | 3/2011 | Kano et al. |
| 7,926,160 B2 | 4/2011 | Zifferer et al. |
| 7,926,865 B2 | 4/2011 | Terada et al. |
| 7,988,809 B2 | 8/2011 | Smith et al. |
| 8,336,933 B2 | 12/2012 | Nagwanshi et al. |
| 8,354,175 B2 | 1/2013 | Impero |
| 8,438,808 B2 | 5/2013 | Carlson et al. |
| 8,459,726 B2 | 6/2013 | Tyan et al. |
| 8,469,416 B2 | 6/2013 | Haneda et al. |
| 8,539,737 B2 | 9/2013 | Tyan et al. |
| 8,573,571 B2 | 11/2013 | Langhorst et al. |
| 8,641,129 B2 | 2/2014 | Tyan et al. |
| 8,659,659 B2 | 2/2014 | Bradai et al. |
| 9,073,582 B2 | 7/2015 | Tyan et al. |
| 9,174,678 B2 | 11/2015 | Tyan et al. |
| 9,187,127 B2 | 11/2015 | Tyan et al. |
| 9,365,245 B2 | 6/2016 | Donabedian et al. |
| 9,533,710 B2 | 1/2017 | Cheng et al. |
| 9,789,906 B1 | 10/2017 | Tyan |
| 9,840,281 B2 | 12/2017 | Tyan et al. |
| 9,845,112 B2 | 12/2017 | Tyan et al. |
| 9,889,887 B2 | 2/2018 | Tyan et al. |
| 9,944,323 B2 | 4/2018 | Tyan et al. |
| 2002/0059087 A1 | 5/2002 | Wahlbin et al. |
| 2002/0153719 A1 | 10/2002 | Taguchi |
| 2003/0085592 A1 | 5/2003 | Seksaria et al. |
| 2005/0028710 A1 | 2/2005 | Carpenter et al. |
| 2006/0033363 A1 | 2/2006 | Hillekes et al. |
| 2006/0181072 A1 | 8/2006 | Tamura et al. |
| 2006/0202493 A1 | 9/2006 | Tamura et al. |
| 2006/0202511 A1 | 9/2006 | Tamura et al. |
| 2006/0249342 A1 | 9/2006 | Canot et al. |
| 2007/0056819 A1 | 3/2007 | Kano et al. |
| 2007/0114804 A1 | 5/2007 | Gross et al. |
| 2008/0012386 A1 | 1/2008 | Kano et al. |
| 2008/0014809 A1 | 1/2008 | Brown et al. |
| 2008/0030031 A1 | 2/2008 | Nilsson et al. |
| 2008/0036242 A1 | 2/2008 | Glance et al. |
| 2008/0098601 A1 | 5/2008 | Heinz et al. |
| 2008/0106107 A1 | 5/2008 | Tan et al. |
| 2008/0164864 A1 | 7/2008 | Bjorn |
| 2008/0185852 A1 | 9/2008 | Suzuki et al. |
| 2008/0217935 A1 | 9/2008 | Braunbeck et al. |
| 2009/0026777 A1 | 1/2009 | Schmid et al. |
| 2009/0085362 A1 | 4/2009 | Terada et al. |
| 2009/0092820 A1 | 4/2009 | Lambers |
| 2009/0102234 A1 | 4/2009 | Heatherington et al. |
| 2009/0174219 A1 | 7/2009 | Foreman |
| 2009/0236166 A1 | 9/2009 | Kowaki et al. |
| 2010/0064946 A1 | 3/2010 | Watson |
| 2010/0066124 A1 | 3/2010 | Terada et al. |
| 2010/0072788 A1 | 3/2010 | Tyan et al. |
| 2010/0102592 A1 | 4/2010 | Tyan et al. |
| 2010/0164238 A1 | 7/2010 | Nakanishi et al. |
| 2011/0012389 A1 | 1/2011 | Kanaya et al. |
| 2011/0015902 A1 | 1/2011 | Cheng et al. |
| 2011/0024250 A1 | 2/2011 | Kitashiba et al. |
| 2011/0102592 A1 | 5/2011 | Bradai et al. |
| 2011/0187135 A1 | 8/2011 | Kano et al. |
| 2011/0223372 A1 | 9/2011 | Metz et al. |
| 2011/0226312 A1 | 9/2011 | Bohm et al. |
| 2012/0205927 A1 | 8/2012 | Asakawa et al. |
| 2012/0261949 A1 | 10/2012 | Tyan et al. |
| 2013/0140850 A1 | 6/2013 | Tyan et al. |
| 2013/0193699 A1 | 8/2013 | Zannier |
| 2013/0221692 A1 | 8/2013 | Wang et al. |
| 2013/0264757 A1 | 10/2013 | Rajasekaran et al. |
| 2013/0292968 A1 | 11/2013 | Tyan et al. |
| 2013/0300138 A1 | 11/2013 | Banasiak et al. |
| 2013/0341115 A1 | 12/2013 | Tyan et al. |
| 2014/0021709 A1 | 1/2014 | Hirose et al. |
| 2014/0127454 A1 | 5/2014 | Kuppers |
| 2014/0203577 A1 | 7/2014 | Nagwanshi et al. |
| 2014/0261949 A1 | 9/2014 | Marella et al. |
| 2014/0353990 A1 | 12/2014 | Ishitobi et al. |
| 2015/0001866 A1 | 1/2015 | Noyori |
| 2015/0084374 A1 | 3/2015 | Tyan et al. |
| 2015/0197206 A1 | 7/2015 | Tamura et al. |
| 2015/0247298 A1 | 9/2015 | Li et al. |
| 2015/0314743 A1 | 11/2015 | Matsushiro |
| 2016/0001725 A1 | 1/2016 | Nakanishi et al. |
| 2016/0001726 A1 | 1/2016 | Keller et al. |
| 2016/0052557 A1 | 2/2016 | Tyan et al. |
| 2016/0068194 A1 | 3/2016 | Tyan et al. |
| 2016/0129866 A1 | 5/2016 | Kamiya |
| 2016/0221521 A1 | 8/2016 | Nishimura et al. |
| 2016/0264083 A1 | 9/2016 | Ishitsuka |
| 2016/0332410 A1 | 11/2016 | Brun |
| 2016/0375935 A1 | 12/2016 | Tyan et al. |
| 2017/0106915 A1 | 4/2017 | Tyan et al. |
| 2017/0113724 A1 | 4/2017 | Tyan et al. |
| 2017/0203790 A1 | 7/2017 | Tyan et al. |
| 2017/0274933 A1 | 9/2017 | Tyan |
| 2017/0307137 A1 | 10/2017 | Tyan et al. |
| 2017/0307138 A1 | 10/2017 | Tyan |
| 2018/0057058 A1 | 3/2018 | Tyan |
| 2018/0057063 A1 | 3/2018 | Tyan et al. |
| 2018/0058530 A1 | 3/2018 | Tyan |
| 2018/0099475 A1 | 4/2018 | Tyan et al. |
| 2018/0099696 A1 | 4/2018 | Tyan et al. |
| 2018/0100621 A1 | 4/2018 | Tyan et al. |

FOREIGN PATENT DOCUMENTS

| | | |
|---|---|---|
| CN | 104890308 A | 9/2015 |
| CN | 105235616 A | 1/2016 |
| DE | 102005037055 A1 | 2/2007 |
| DE | 102009035782 A1 | 3/2010 |
| EP | 0856681 A1 | 8/1998 |
| FR | 2375496 A2 | 7/1978 |
| GB | 1123337 A | 8/1968 |
| JP | 08-337183 | 12/1996 |
| JP | 3897542 B2 | 1/2007 |
| JP | 200723661 A | 2/2007 |
| JP | 2008-0168745 A | 7/2008 |
| JP | 2008261493 A | 10/2008 |
| JP | 2009184417 A | 8/2009 |
| JP | 04-371059 | 11/2009 |
| JP | 2011051581 A | 3/2011 |
| JP | 2012107660 A | 6/2012 |
| JP | 2013-159132 A | 8/2013 |
| JP | 5348910 B2 | 8/2013 |
| JP | 2014004973 A | 1/2014 |

(56) References Cited

FOREIGN PATENT DOCUMENTS

| JP | 2015124784 A | 7/2015 |
|---|---|---|
| RU | 2246646 C2 | 10/2004 |
| WO | 92/09766 A1 | 6/1992 |

OTHER PUBLICATIONS

Non-Final Office Action dated Jun. 22, 2018 from U.S. Appl. No. 15/244,450.
Notice of Allowance dated Jun. 22, 2018 from U.S. Appl. No. 15/248,136.
Non-Final Office Action dated Jul. 24, 2018, from U.S. Appl. No. 15/138,466.
Machine translation for JP08-337183.
PABR in Response to NFOA dated Dec. 17, 2015 from U.S. Appl. No. 12/891,801.
Ali Najafi et al., "Mechanics of Axial Plastic Collapse in Multi-Cell, Multi-Corner Crush Tubes," sciencedirect.com, Sep. 1, 2010.
Xiong Zhang et al., "Crushing Analysis of Polygonal Columns and Angle Elements," sciencedirect.com, Jun. 27, 2009.
Sivakumar Palanivelua et al., "Comparison of the Crushing Performance of Hollow and Foam-Filled Small-Scale Composite Tubes With Different Geometrical Shapes for Use in Sacrificial Structures," sciencedirect.com, Jun. 1, 2010.
Fyllingen et al., "Simulations of a Top-Hat Section Subjected to Axial Crushing Taking Into Account Material and Geometry Variations," sciencedirect.com, Jul. 31, 2008.
Minoru Yamashita et al., "Quasi-Static and Dynamic Axial Crushing of Various Polygonal Tubes," sciencedirect.com, Jun. 2007.
Comparison of Energy Absorption of Various Section Steel Tubes under Axial Compression and Bending Loading, The 21st Conference of Mechanical Engineering network of Thailand, Oct. 19, 2007. p. 590-593. (See IDS of Sep. 23, 2014 for U.S. Appl. No. 12/891,801).
Yoshioka Nakazawa et al., "Development of Crash-Box for Passenger Car With High Capability for Energy Absorption", VIII International Conference on Computation Plasticity (Complas VIII), Barcelona, 2005.
Office Action dated Aug. 17, 2012 from U.S. Appl. No. 13/087,663.
Nov. 16, 2012 Response to Office Action dated Aug. 17, 2012 from U.S. Appl. No. 13/087,663.
Office Action dated Mar. 2, 2015 from U.S. Appl. No. 14/010,115.
Office Action dated Mar. 16, 2015 from U.S. Appl. No. 14/010,115.
Office Action dated Sep. 15, 2014 from U.S. Appl. No. 13/902,116.
Dec. 12, 2014 Response to Office Action dated Sep. 15, 2014 from U.S. Appl. No. 13/902,116.
Office Action dated Aug. 19, 2011 from U.S. Appl. No. 12/233,808.
Nov. 11, 2011 Response to Office Action dated Aug. 19, 2011 from U.S. Appl. No. 12/233,808.
Office Action dated Mar. 7, 2012 from U.S. Appl. No. 12/233,808.
Jun. 6, 2012 Response to Office Action dated Mar. 7, 2012 from U.S. Appl. No. 12/233,808.
Office Action dated Jul. 31, 2012 from U.S. Appl. No. 12/233,808.
Oct. 31, 2012 Response to Office Action dated Jul. 31, 2012 from U.S. Appl. No. 12/233,808.
Office Action dated Feb. 27, 2013 from U.S. Appl. No. 12/233,808.
Apr. 29, 2013 Response to Office Action dated Feb. 27, 2013 from U.S. Appl. No. 12/233,808.
Office Action dated Jul. 20, 2012 from U.S. Appl. No. 12/651,614.
Oct. 22, 2012 Response to Office Action dated Jul. 20, 2012 from U.S. Appl. No. 12/651,614.
Office Action dated Feb. 21, 2013 from co-pending U.S. Appl. No. 12/651,614.
Apr. 22, 2013 Response to Office Action dated Feb. 21, 2013 from U.S. Appl. No. 12/651,614.
Advisory Action dated May 6, 2013 from co-pending U.S. Appl. No. 12/651,614.
Office Action dated Jun. 6, 2013 from U.S. Appl. No. 12/651,614.
Sep. 5, 2013 Response to Office Action dated Jun. 6, 2013 from U.S. Appl. No. 12/651,614.
Office Action dated Jun. 28, 2013 from U.S. Appl. No. 12/891,801.
Sep. 27, 2013 Response to Office Action dated Jun. 28, 2013 from U.S. Appl. No. 12/891,801.
Office Action dated Jan. 16, 2014 from U.S. Appl. No. 12/891,801.
Mar. 18, 2014 Response to Office Action dated Jan. 16, 2014 from U.S. Appl. No. 12/891,801.
Office Action dated Apr. 25, 2014 from U.S. Appl. No. 12/891,801.
Jul. 23, 2014 Response to Office Action dated Apr. 25, 2014 from U.S. Appl. No. 12/891,801.
Office Action dated Nov. 6, 2014 from U.S. Appl. No. 12/891,801.
May 21, 2013 Response to Office Action dated Feb. 21, 2013 from U.S. Appl. No. 12/651,614.
Office Action dated Jul. 18, 2014 from U.S. Appl. No. 14/010,115.
Oct. 20, 2014 Response to Office Action dated Jul. 18, 2014 from U.S. Appl. No. 14/010,115.
Office Action dated Jan. 3, 2014 from U.S. Appl. No. 14/010,115.
Apr. 3, 2014 Response to Office Action dated Jan. 3, 2014 from U.S. Appl. No. 14/010,115.
Office Action dated Dec. 17, 2015 from U.S. Appl. No. 12/891,801.
Non-Final Office Action dated Jul. 27, 2018, from U.S. Appl. No. 14/749,426.
Final Office Action dated Aug. 31, 2018, from U.S. Appl. No. 15/395,524.
Extended Search Report in EP Appln No. 15195185.2 dated May 19, 2016.
Non-Final Office Action dated Feb. 22, 2017 from U.S. Appl. No. 15/078,517.
Notice of Allowance dated Jun. 5, 2017 from U.S. Appl. No. 15/078,517.
Non-Final Office Action dated Mar. 17, 2017 from U.S. Appl. No. 14/749,426.
Non-Final Office Action dated Feb. 7, 2017 from U.S. Appl. No. 14/923,802.
Non-Final Office Action dated Mar. 20, 2017 from U.S. Appl. No. 15/001,668.
Non-Final Office Action dated Nov. 1, 2016 from U.S. Appl. No. 14/930,299.
Final Office Action dated May 16, 2017 from U.S. Appl. No. 14/930,299.
Non-Final Office Action dated Jan. 23, 2017 from U.S. Appl. No. 14/942,385.
Final Office Action dated May 15, 2017 from U.S. Appl. No. 14/942,385.
Final Office Action dated Jul. 10, 2017 from U.S. Appl. No. 14/749,426.
Notice of Allowance dated Aug. 4, 2017 from U.S. Appl. No. 14/942,385.
Final Office Action dated Aug. 25, 2017 from U.S. Appl. No. 14/923,802.
Notice of Allowance dated Aug. 10, 2017 from U.S. Appl. No. 14/930,299.
Notice of Allowance dated Oct. 4, 2017 from U.S. Appl. No. 15/001,668.
Final Office Action dated Dec. 12, 2017 from U.S. Appl. No. 14/749,426.
Non-Final Office Action dated Nov. 30, 2017 from U.S. Appl. No. 15/248,136.
Notice of Allowance dated Dec. 4, 2017 from U.S. Appl. No. 14/923,802.
Non-Final Office Action dated Feb. 12, 2018 from U.S. Appl. No. 15/395,524.
Non-Final Office Action dated Mar. 27, 2018 from U.S. Appl. No. 14/749,426.
Notice of Allowance dated Dec. 20, 2018 from U.S. Appl. No. 15/138,466.
Notice of Allowance dated Jan. 14, 2019, from U.S. Appl. No. 15/251,099.
Notice of Allowance dated Jan. 24, 2019, from U.S. Appl. No. 14/749,426.
Final Office Action dated Nov. 7, 2018 from U.S. Appl. No. 14/749,426.

(56) References Cited

OTHER PUBLICATIONS

Non-Final Office Action dated Nov. 28, 2018 from U.S. Appl. No. 15/395,524.
Non-Final Office Action dated Dec. 21, 2018 from U.S. Appl. No. 15/291,465.
Non-Final Office Action dated Jan. 18, 2019, from U.S. Appl. No. 15/291,486.

TWENTY-EIGHT-CORNERED STRENGTHENING MEMBER FOR VEHICLES

RELATED APPLICATIONS

This application is related to U.S. patent application Ser. No. 15/251,099, entitled "TWENTY-EIGHT-CORNERED STRENGTHENING MEMBER FOR VEHICLES," and filed on a date even herewith; the entire contents of which is incorporated by reference herein.

TECHNICAL FIELD

The present disclosure relates generally to a strengthening member for a vehicle body or other structures. The present disclosure relates more specifically to a strengthening member having a twenty-eight-cornered cross section and to motor vehicles including a strengthening member having a twenty-eight-cornered cross section.

BACKGROUND

It is desirable, for vehicle strengthening members, to maximize impact energy absorption and bending resistance while minimizing mass per unit length of the strengthening member. Impact energy absorption may be maximized, for example, by assuring that the strengthening member compacts substantially along a longitudinal axis of the strengthening member upon experiencing an impact along this axis. Such longitudinal compaction may be referred to as a stable axial crush of the strengthening member.

When a compressive force is exerted on a strengthening member, for example, by a force due to a front impact load on a vehicle's front rail or other strengthening member in the engine compartment, the strengthening member can crush in a longitudinal direction to absorb the energy of the collision. In addition, when a bending force is exerted on a strengthening member, for example, by a force due to a side impact load on a vehicle's front side sill, B-pillar or other strengthening member, the strengthening member can bend to absorb the energy of the collision.

Conventional strengthening members rely on increasing the thickness and hardness of side and/or corner portions to improve crush strength. However, such increased thickness and hardness increases weight of the strengthening member and reduces manufacturing feasibility. It may be desirable to provide a strengthening assembly configured to achieve the same or similar strength increase as provided by the thickened sides and/or corners, while minimizing mass per unit length of the member, and maintaining a high manufacturing feasibility.

It may further be desirable to provide a strengthening member that can achieve increased energy absorption and a more stable axial collapse when forces such as front and side impact forces are exerted on the strengthening member, while also conserving mass to reduce vehicle weights and meet emission requirements. Also, it may be desirable to provide a strengthening member that can achieve improved energy absorption and bend when a bending force is exerted on the strengthening member. Additionally, it may be desirable to provide a strengthening member that possesses improved noise-vibration-harshness performance due to work hardening on its corners. In addition, it may be desirable, to provide a tunable strengthening member cross section configured to achieve strength increases (i.e., load carrying and energy absorption) over basic polygonal designs, while also allowing flexibility in design to meet a range of vehicle applications.

SUMMARY

In accordance with various exemplary embodiments of the present disclosure, a strengthening member for a motor vehicle is provided. The strengthening member has twenty-eight sides arranged to create twenty internal angles and eight external angles.

In accordance with another aspect of the present disclosure, a strengthening member for a motor vehicle is provided. The strengthening member has a cross section including twenty-eight corners and having twenty-eight sides arranged to create internal angles and external angles. The angles alternate in a pattern including three consecutive internal angles, one external angle, two additional consecutive internal angles, and one additional external angle.

In accordance with another aspect of the present disclosure, a vehicle is provided. The vehicle includes a strengthening member. The strengthening member has a cross section including twenty-eight corners and having twenty-eight sides arranged to create twenty internal angles and eight external angles.

In accordance with another aspect of the present disclosure, a strengthening member for a motor vehicle is provided. The strengthening member has twenty-eight sides and twenty-eight corners. A cross section of the strengthening member includes four lobe portions and four protrusion portions.

Additional objects and advantages will be set forth in part in the description which follows, and in part will be obvious from the description, or may be learned by practice of the present teachings. The objects and advantages of the present disclosure will be realized and attained by means of the elements and combinations particularly pointed out in the appended claims.

It is to be understood that both the foregoing general description and the following detailed description are exemplary and explanatory only and are not restrictive of the claimed subject matter. The accompanying drawings, which are incorporated in and constitute part of this specification, illustrate exemplary embodiments of the present disclosure and together with the description, serve to explain principles of the present teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein.

Figure 1A:
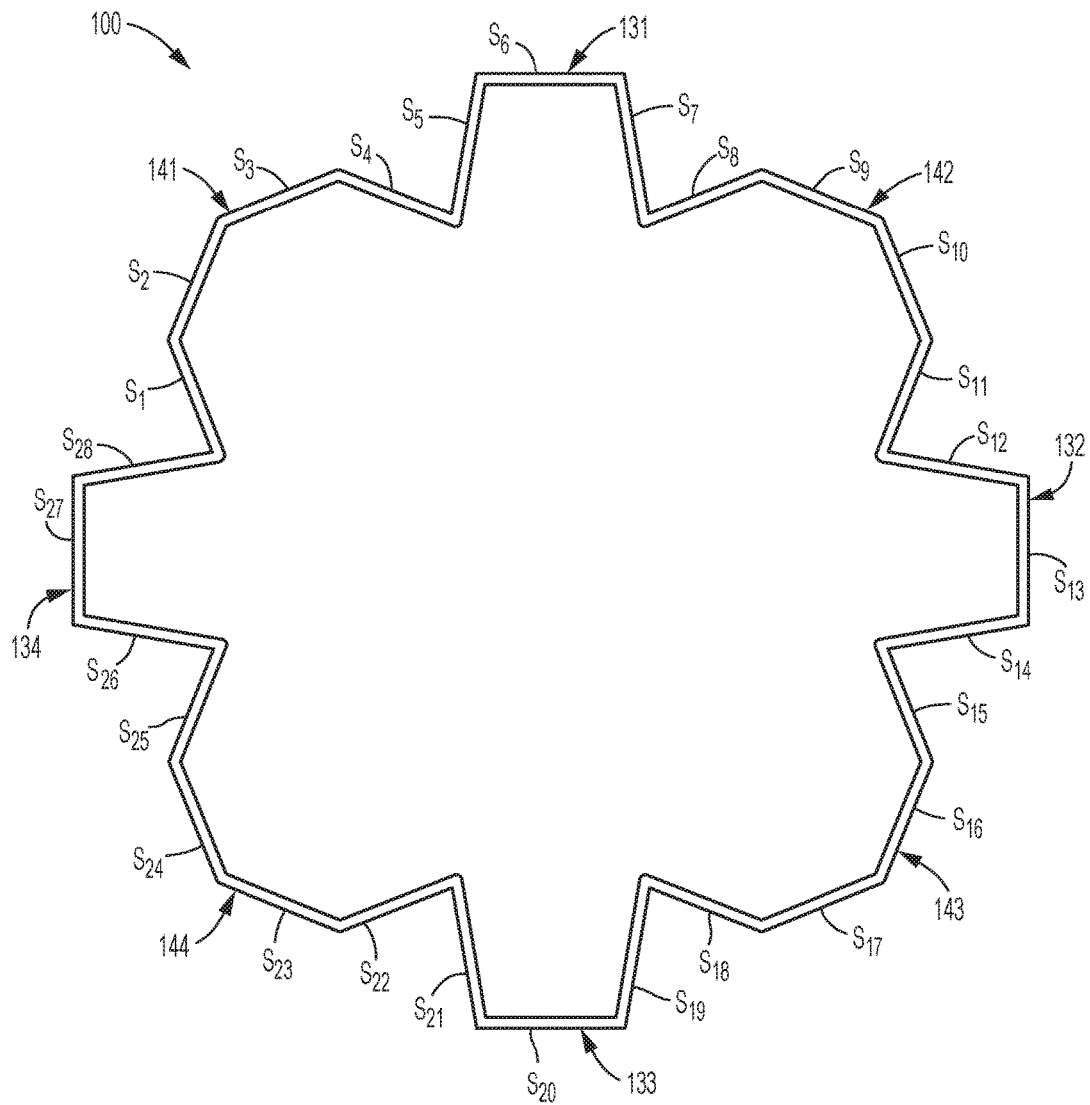
FIG. 1A is a cross-sectional view of a strengthening member having a twenty-eight-cornered cross section including twenty internal angles and eight external angles in accordance with the present teachings.

Although the following detailed description makes reference to exemplary illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. In the drawings and the description, similar elements are provided with similar reference numerals. It is to be noted that the features explained individually in the description can be mutually combined in any technically expedient manner and disclose additional embodiments of the present disclosure.

This description's terminology is not intended to limit the disclosed subject matter. For example, spatially relative terms—such as "beneath", "below", "lower", "above", "upper", "proximal", "distal", "front", "rear", "left", "right", "horizontal", "vertical", and the like—may be used to describe one element's or feature's relationship to another element or feature as illustrated in the figures. These spatially relative terms are intended to encompass different positions (i.e., locations) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features.

The present teachings contemplate strengthening members with twenty-eight-cornered cross sections. The cross-sectional configuration of these strengthening members provides increased stiffness throughout the sides and corners of the strengthening member when compared to conventional strengthening members. Such conventional strengthening members rely on increasing thickness within the corners to achieve increases in strength, which result in increases in the weight of the strengthen member. The strengthening members of the present disclosure are designed based in part on, for example, a variety of tunable parameters configured to achieve strength increases (i.e., load carrying and energy absorption) over basic polygonal designs (e.g., polygonal strengthening member cross sections having less or the same number of sides), while also allowing design flexibility to meet a range of vehicle applications.

In accordance with the present teachings, the shape of the strengthening members disclosed herein provides the strengthening member with stabilized folding, reduced crush distance, and increased energy absorption in response to an axially applied crash force, when compared to conventional strengthening members. In at least some embodiments, the shape also improves moisture shedding abilities of the strengthening member and permits a more customized fit with other vehicle components.

The strengthening members in accordance with the present teachings can achieve increased energy absorption and a more stable axial collapse when forces such as front and side impact forces are exerted on the strengthening member. Furthermore, the side lengths and configurations, and/or degrees of the internal and external angles, of the strengthening members in accordance with the present teachings can achieve a similar, if not greater, strength increase as thickened corners, while minimizing mass per unit length of the member and maintaining a high manufacturing feasibility because the member can be formed by stamping, bending, press forming, hydro-forming, molding, casting, extrusion, uniform or non-uniform roll forming, machining, forging, 3-D printing, and/or other known suitable manufacturing processes. Thus-formed sections can be joined via welding, brazing, soldering, adhesive bonding, fastening, press fitting or other known joining technologies.

Strengthening members in accordance with the present teachings may be made, for example, of steel alloys, titanium alloys, aluminum alloys, magnesium alloys, nylons, plastics, polymers, composites, fiber-reinforced composites, silicone, semiconductor, papers, hybrid materials (i.e., multiple dissimilar materials), shape-memory materials, foams, gels or any other suitable materials. Those of ordinary skill in the art would understand, for example, that the material used for a strengthening member may be chosen based at least in part on intended application, strength/weight considerations, cost, packaging space, and/or other design factors.

Turning to the drawings, an exemplary embodiment of a cross section of a strengthening member 100 having twenty-eight corners in accordance with the present teachings is illustrated in FIG. 1A. The strengthening member 100 has twenty-eight sides $S_1$-$S_{28}$. The sides $S_1$-$S_{28}$ of the strengthening member may define a cross section of the strengthening member having four lobe portions 141-144 and four protrusion portions 131-134, in accordance with the present teachings. Each lobe portion may be defined by four of the sides, for example, sides $S_1$-$S_4$ define a first lobe portion 141, sides $S_8$-$S_{11}$ define a second lobe portion 142, sides $S_{15}$-$S_{18}$ define a third lobe portion 143, and sides $S_{22}$-$S_{25}$ define a fourth lobe portion 144 of the cross section of strengthening member 100. Each protrusion portion may be defined by three of the sides, for example, sides $S_5$-$S_7$ define a first protrusion portion 131, sides $S_{12}$-$S_{14}$ define a second protrusion portion 132, sides $S_{19}$-$S_{21}$ define a third protrusion portion 133, and sides $S_{26}$-$S_{28}$ define a fourth protrusion portion 134 of the cross section of strengthening member 100.

Figure 1B:
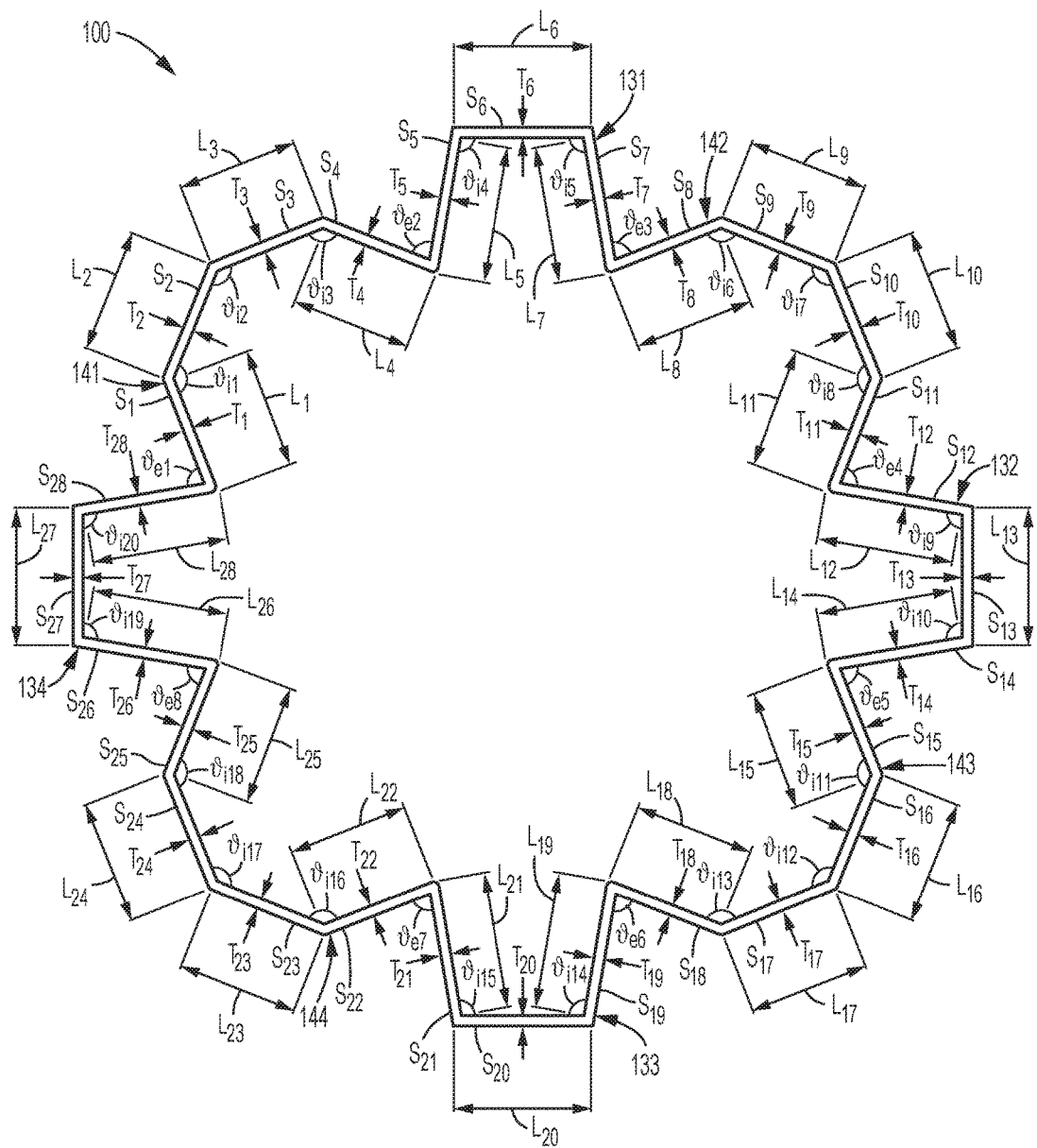
FIG. 1B is another the cross-sectional view of the strengthening member of FIG. 1A, with various lengths, thicknesses, and angles identified.

As labeled in FIG. 1B, the illustrated cross section of the strengthening member 100 comprises twenty-eight sides $S_1$-$S_{28}$ having cross-sectional lengths $L_1$-$L_{28}$ and cross-sectional thicknesses $T_1$-$T_{28}$. Sides $S_1$-$S_{28}$ define twenty internal corners with cross-sectional angles $\vartheta_{i1}$-$\vartheta_{i20}$, and eight external corners with cross-sectional angles $\vartheta_{e1}$-$\vartheta_{e8}$.

The perimeter of the twenty-eight-sided cross section generally forms a polygon comprising a plurality of internal and external corners. As embodied herein and shown in FIGS. 1A-1B, the polygon may be formed of alternating internal and external angles, and in particular, may be formed by alternating three consecutive internal corners/angles and one external corner/angle with two consecutive internal corners/angles and one external corner/angle. This repeating pattern (i.e., an alternating three-in-one-out-two-in-one-out configuration), results in a cross section with up to four bisecting planes of symmetry. Under an axial and symmetric loading condition, strengthening members with symmetrical, polygonal cross sections, including the various embodiments of the present teachings, may have better load carrying capabilities and energy absorbing capabilities than those with asymmetrical, polygonal cross sections with an equivalent number of corners and sides. Furthermore, strengthening members with symmetrical, polygonal cross sections with more than two bisecting planes of symmetry (e.g., three bisecting planes of symmetry, four bisecting planes of symmetry, or five or more bisecting planes of symmetry), including the various embodiments of the present teachings, may have better load carrying capabilities and energy absorbing capabilities than those with symmetrical, polygonal cross sections with two or fewer bisecting planes of symmetry and an equivalent number of corners and sides. For example, the exemplary cross section shown in FIG. 1 has four bisecting planes of symmetry. However, as those of ordinary skill in the art will understand, use of asymmetrical cross sections may offer other benefits that provide advantages that cannot be realized using a symmetrical cross section. The present disclosure contemplates that a twenty-eight-sided, twenty-eight-cornered cross section, in accordance with the present teachings, may be either symmetrical or asymmetrical.

Depending upon the particular application and/or the desired features of the strengthening member, the cross-sectional lengths of the sides and the cross-sectional thicknesses of the sides of the twenty-eight-sided, twenty-eight-cornered strengthening member as well as the internal and external corner angles of the strengthening member can be varied (i.e., can be tuned) to achieve improved strength and other performance features (e.g., stability of folding pattern) of the strengthening member when compared to conventional strengthening members. Varying these features of the twenty-eight-sided, twenty-eight-cornered strengthening member may obviate the need for increased side and/or corner thickness. In accordance with various exemplary embodiments of the present teachings, the cross-sectional lengths $L_1$-$L_{28}$ of sides $S_1$-$S_{28}$, the cross-sectional thicknesses $T_1$-$T_{28}$ of the sides as well as the cross-sectional internal angles $\vartheta_{i1}$-$\vartheta_{i20}$ of the internal corners and external angles $\vartheta_{e1}$-$\vartheta_{e8}$ of the external corners can be varied to a certain degree, as would be understood by one skilled in the art, for example in accordance with available packaging space within a vehicle.

In addition, in a strengthening member in accordance with the present teachings, each internal corner angle $\vartheta_{i1}$-$\vartheta_{i20}$ of a cross section of the strengthening member can range from about 45° to about 175°, and each external corner angle $\vartheta_{e1}$-$\vartheta_{e8}$ of a cross section of the strengthening member can range from about 45° to about 175°. In accordance with the present teachings, the internal angles $\vartheta_{i1}$-$\vartheta_{i20}$ of a cross section of the strengthening member may all be substantially the same, and/or, the external angles $\vartheta_{e1}$-$\vartheta_{e8}$ of a cross section of the strengthening member may all be substantially the same. Additionally or alternatively, the present disclosure contemplates embodiments in which at least some of the internal angles $\vartheta_{i1}$-$\vartheta_{i20}$ of a cross section of the strengthening member differ from one another, and/or similarly, at least some of the external angles $\vartheta_{e1}$-$\vartheta_{e8}$ of a cross section of the strengthening member differ from one another.

In various exemplary embodiments according to the present disclosure, the internal angles $\vartheta_{i1}$-$\vartheta_{i3}$, $\vartheta_{i6}$-$\vartheta_{i8}$, $\vartheta_{i11}$-$\vartheta_{i13}$, and $\vartheta_{i16}$-$\vartheta_{i18}$ that at least partially define each lobe portion 141-144 may all be substantially the same, and/or, the internal angles $\vartheta_{i4}$-$\vartheta_{i5}$, $\vartheta_{i9}$-$\vartheta_{i10}$, $\vartheta_{i14}$-$\vartheta_{i15}$, and $\vartheta_{i19}$-$\vartheta_{i20}$ that at least partially define each protrusion portion 131-134 may all be substantially the same, and/or the external angles $\vartheta_{e1}$-$\vartheta_{e8}$ may all be substantially the same. In various exemplary embodiments, internal angles $\vartheta_{i1}$-$\vartheta_{i3}$, $\vartheta_{i6}$-$\vartheta_{i8}$, $\vartheta_{i11}$-$\vartheta_{i13}$, and $\vartheta_{i16}$-$\vartheta_{i18}$ that at least partially define each lobe portion 141-144 may each range from about 120° to about 150° or from about 135° to about 139°; internal angles $\vartheta_{i4}$-$\vartheta_{i5}$, $\vartheta_{i9}$-$\vartheta_{i10}$, $\vartheta_{i14}$-$\vartheta_{i15}$, and $\vartheta_{i19}$-$\vartheta_{i20}$ that at least partially define each protrusion portion 131-134 may each range from about 90° to about 120° or from about 98° to about 102°; and each external corner angle $\vartheta_{e1}$-$\vartheta_{e8}$ may range from about 60° to about 90° or from about 76° to about 80°. For example, FIG. 1B illustrates an exemplary cross section in which internal angles $\vartheta_{i1}$-$\vartheta_{i3}$, $\vartheta_{i6}$-$\vartheta_{i8}$, $\vartheta_{i11}$-$\vartheta_{i13}$, and $\vartheta_{i16}$-$\vartheta_{i18}$ that at least partially define each lobe portion 141-144 are about 137°; internal angles $\vartheta_{i4}$-$\vartheta_{i5}$, $\vartheta_{i9}$-$\vartheta_{i10}$, $\vartheta_{i14}$-$\vartheta_{i15}$, and $\vartheta_{i19}$-$\vartheta_{i20}$ that at least partially define each protrusion portion 131-134 are about 100°; and each external corner angle $\vartheta_{e1}$-$\vartheta_{e8}$ is about 78°.

In certain exemplary embodiments of the present disclosure, such as in an automotive application, for example, a cross-sectional length $L_1$-$L_{28}$ of each side $S_1$-$S_{28}$ of a cross section of the strengthening member can range from about 10 mm to about 250 mm. In other exemplary embodiments, such as in an aircraft, spacecraft, watercraft, or building application, for example, a cross-sectional length $L_1$-$L_{28}$ of each side $S_1$-$S_{28}$ of the cross section of the strengthening member may be larger. FIG. 1B illustrates an exemplary cross section in which cross-sectional lengths $L_1$-$L_4$, $L_8$-$L_{11}$, $L_{15}$-$L_{18}$, and $L_{22}$-$L_{25}$ of sides $S_1$-$S_4$, $S_8$-$S_{11}$, $S_{15}$-$S_{18}$, and $S_{22}$-$S_{25}$, respectively, are each a first length, e.g., 20 mm; and cross-sectional lengths $L_5$-$L_7$, $L_{12}$-$L_{14}$, $L_{19}$-$L_{21}$, and $L_{26}$-$L_{28}$ of sides $S_5$-$S_7$, $S_{12}$-$S_{14}$, $S_{19}$-$S_{21}$, and $S_{26}$-$S_{28}$, respectively, are each a second length, e.g., 20 mm. While the first and second lengths are the same in this example, it is contemplated that the first and second length may be different. It is also contemplated that more than two lengths may be used.

In certain exemplary embodiments of the present disclosure, such as in an automotive application, for example, a thickness $T_1$-$T_{28}$ of the sides of the cross section of the strengthening member can range from about 0.6 mm to about 6.0 mm. In other exemplary embodiments of the strengthening member, such as in an aircraft, spacecraft, watercraft, or building application, for example, a thickness $T_1$-$T_{28}$ of the sides of a cross section of the strengthening member may be larger. In one exemplary embodiment, a cross-sectional thickness $T_1$-$T_{28}$ of each of the sides of the strengthening member may be about 3.3 mm. In another exemplary embodiment, a cross-sectional thickness $T_1$-$T_{28}$ of each of the sides may be about 2.3 mm. In another exemplary embodiment, a cross-sectional thickness $T_1$-$T_{28}$ of each of the sides may be about 2.0 mm. In some exemplary embodiments, the cross-sectional thickness $T_1$-$T_{28}$ of the sides is substantially the same as the thickness of the corners for each side. In some exemplary embodiments the cross-sectional thickness $T_1$-$T_{28}$ of each side wall, (e.g., side walls $S_{201}$-$S_{228}$, respectively (see FIG. 2A)), can vary with respect to each other side wall. Alternatively or concurrently, the cross-sectional thickness $T_1$-$T_{28}$ can vary along the respective cross-sectional lengths $L_1$-$L_{28}$ of the sides $S_1$-$S_{28}$.

Figure 2A:
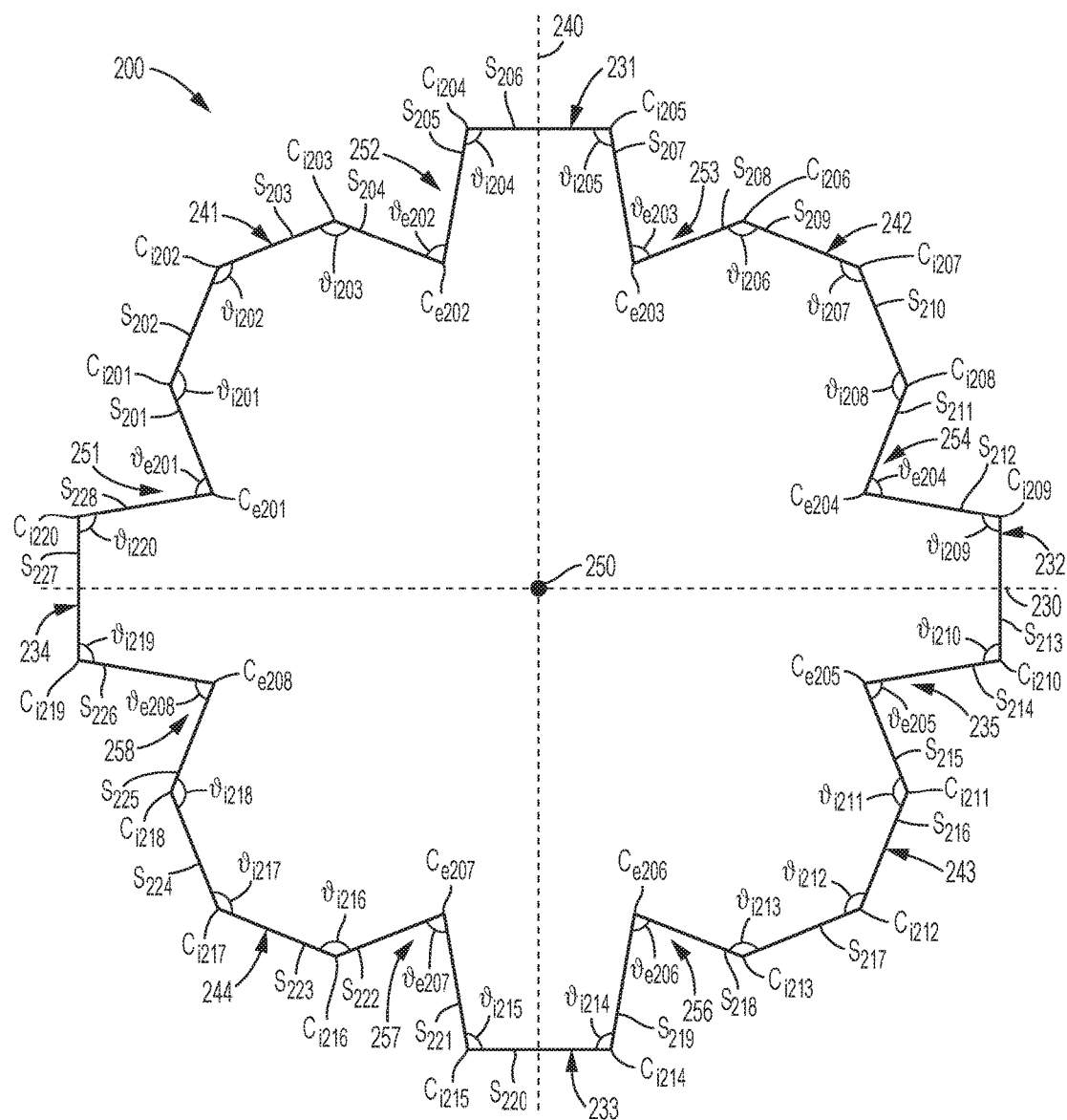
FIGS. 2A-2B are top and perspective views, respectively, of a first exemplary embodiment of a strengthening member having a twenty-eight-cornered cross section with twenty internal angles and eight external angles, as shown in FIG. 1A.
Figure 2B:
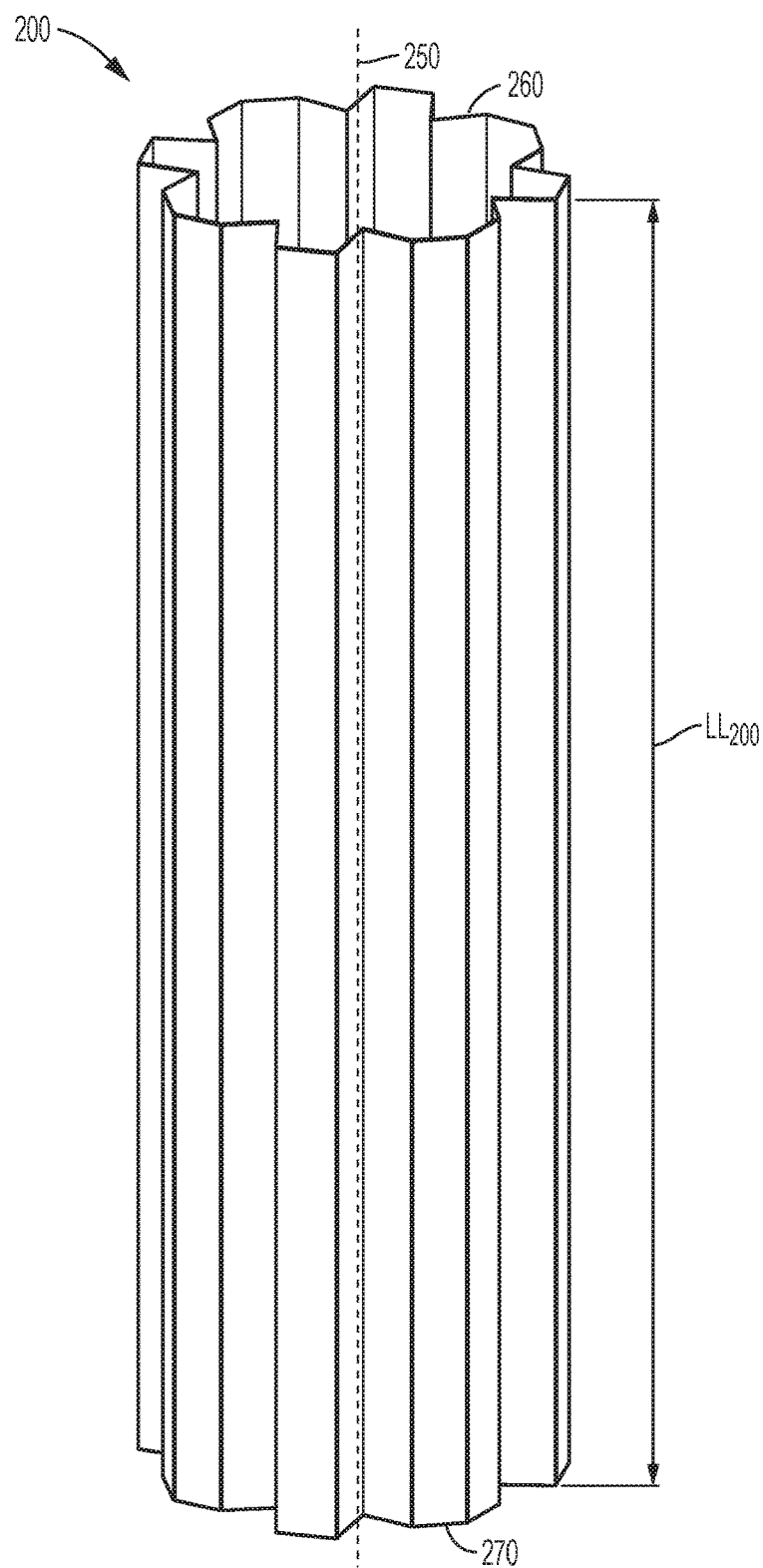

Top and perspective views of a first exemplary embodiment of a strengthening member 200 having a twenty-eight-cornered cross section, with twenty internal angles and eight external angles are illustrated in FIGS. 2A-2B, respectively. Strengthening member 200 has twenty-eight corners $C_{i201}$-$C_{i220}$ and $C_{e201}$-$C_{e208}$ and twenty-eight side walls $S_{201}$-$S_{228}$. Twenty of the corners are internal angle corners $C_{i201}$-$C_{i220}$ and eight of the corners are external angle corners $C_{e201}$-$C_{e208}$. The strengthening member 200 includes four lobe portions 241-244 and four protrusion portions 231-234. Each lobe portion is defined by four sides, for example, sides $S_{201}$-$S_{204}$ define a first lobe portion 241, sides $S_{208}$-$S_{211}$ define a second lobe portion 244, sides $S_{215}$-$S_{218}$ define a third lobe portion 243, and sides $S_{222}$-$S_{225}$ define a fourth lobe portion 244 of strengthening member 200. Each protrusion portion is defined by three sides, for example, sides $S_{205}$-$S_{207}$ define a first protrusion portion 231, sides $S_{212}$-$S_{214}$ define a second protrusion portion 232, sides $S_{219}$-$S_{221}$ define a third protrusion portion 233, and sides $S_{226}$-$S_{228}$ define a fourth protrusion portion 234 of strengthening member 200. The dimension-to-dimension ratio of the cross section of the strengthening member 200, taken along transverse axes 230, 240 is 1:1.

Also, as shown in FIGS. 2A-2B, strengthening member 200 includes recessed areas 251, 252, 253, 254, 255, 256, 257, and 258. Each recessed area 251-258 extends along the length of the strengthening member 200 from first end 260 to second end 270. A side of an adjacent lobe portion and protrusion portion define each recess along a length of the strengthening member 200.

Strengthening member 200 also has a first transverse axis 230, a second transverse axis 240, and a longitudinal axis 250. Although shown with its longitudinal axis 250 positioned substantially vertically (in FIG. 2B), when strengthening member 200 (as well as all of the other various embodiments in accordance with the present teachings) is installed within a vehicle, the longitudinal axis 250 of the strengthening member may be oriented substantially horizontally.

The strengthening member 200 of FIGS. 2A-2B also has a uniform cross section along a length of the strengthening member 200, from first end 260 to second end 270 of the strengthening member 200. Additionally, the longitudinal length $LL_{200}$ of each side $S_{201}$-$S_{228}$ is approximately the same, as shown in FIG. 2B. As also illustrated, for all cross sections, each of twelve of the internal angles are substantially the same, each of the other eight internal angles are substantially the same, and all eight of the external angles are substantially the same. In various exemplary embodiments, internal angles $\vartheta_{i201}$-$\vartheta_{i203}$, $\vartheta_{i206}$-$\vartheta_{i208}$, $\vartheta_{i211}$-$\vartheta_{i213}$, and $\vartheta_{i216}$-$\vartheta_{i218}$ that at least partially define each lobe portion 141-144 may each range from about 120° to about 150° or from about 135° to about 139°; internal angles $\vartheta_{i204}$, $\vartheta_{i205}$, $\vartheta_{i209}$, $\vartheta_{i210}$, $\vartheta_{i214}$, $\vartheta_{i215}$, $\vartheta_{i219}$, and $\vartheta_{i220}$ that at least partially define each protrusion portion 131-134 may each range from about 90° to about 120° or from about 98° to about 102°; and each external corner angle $\vartheta_{e201}$-$\vartheta_{e208}$ may range from about 76° to about 80°. For example, in the exemplary embodiment of FIGS. 2A-2B, each of twelve of the internal angles $\vartheta_{i201}$-$\vartheta_{i203}$, $\vartheta_{i206}$-$\vartheta_{i208}$, $\vartheta_{i211}$-$\vartheta_{i213}$, and $\vartheta_{i216}$-$\vartheta_{i218}$ that at least partially define each lobe portion 241-244 are about 137°; each of the other eight internal angles $\vartheta_{i204}$, $\vartheta_{i205}$, $\vartheta_{i209}$, $\vartheta_{i210}$, $\vartheta_{i214}$, $\vartheta_{i215}$, $\vartheta_{i219}$, and $\vartheta_{i220}$ that at least partially define each protrusion portion 241-244 are about 100°; and all eight of the external angles $\vartheta_{e201}$-$\vartheta_{e208}$ are 78°. The thicknesses of each side wall $S_{201}$-$S_{228}$ are also substantially the same.

Figure 3A:
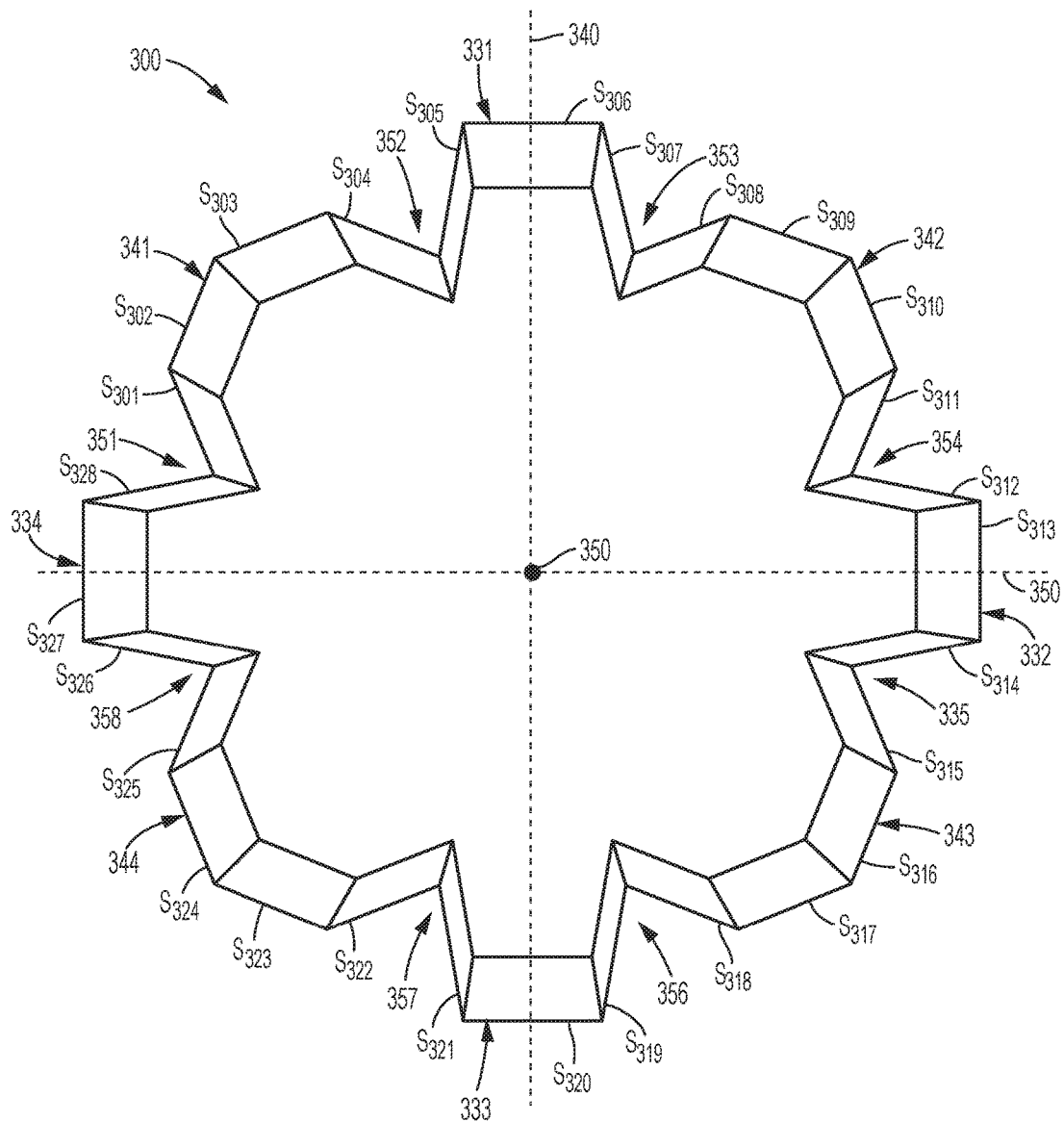
FIGS. 3A-3B are top and perspective views, respectively, of a second exemplary embodiment of a strengthening member having a twenty-eight-cornered cross section with twenty internal angles and eight external angles in accordance with the present teachings.
Figure 3B:
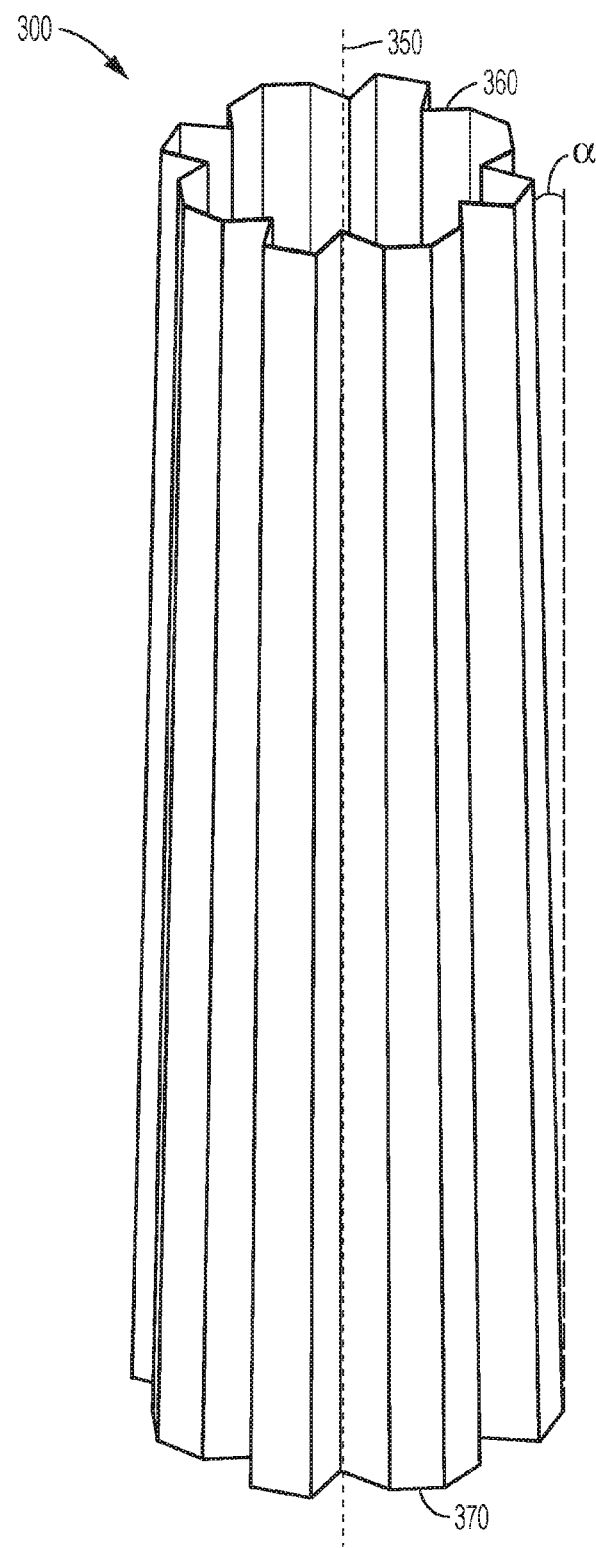

Top and perspective views of an alternative exemplary embodiment of a strengthening member 300 having a twenty-eight-cornered cross section, with twenty internal angles and eight external angles, are illustrated in FIGS. 3A-3B, respectively. The cross section of the strengthening member 300 includes a four lobe portions and four protrusions. Each lobe portion is defined by four sides, for example, sides $S_{301}$-$S_{304}$ define a first lobe portion 341, sides $S_{308}$-$S_{311}$ define a second lobe portion 342, sides $S_{315}$-$S_{318}$ define a third lobe portion 343, and sides $S_{322}$-$S_{325}$ define a fourth lobe portion 344 of the cross section of strengthening member 300. Each protrusion portion is defined by three sides, for example, sides $S_{305}$-$S_{307}$ define a first protrusion portion 331, sides $S_{312}$-$S_{314}$ define a second protrusion portion 332, sides $S_{319}$-$S_{321}$ define a third protrusion portion 333, and sides $S_{326}$-$S_{328}$ define a fourth protrusion portion 334 of strengthening member 300. The dimension-to-dimension ratio of the cross section of strengthening member 300, taken along transverse axes 330, 340 is 1:1.

Strengthening member 300 may differ from strengthening member 200 in several aspects. For example, as shown in FIGS. 3A and 3B, one or more of the side walls of the strengthening member may be angled with respect to the longitudinal axis 350 of the strengthening member to provide a taper to at least a portion of the shape of the strengthening member 300. As shown in FIGS. 3A-3B, strengthening member 300 is tapered along its length, from a first end 360 of the strengthening member 300 to a second end 370 of the strengthening member. The strengthening member 300 tapers along its length at an angle α, which may range from about 1° to about 65°. The degree of taper of each side wall may be substantially the same, or different side walls may exhibit differing degrees of taper. Tapering may be required due to component packaging constraints and/or to effectively couple, attach or otherwise bond other components to a strengthening member.

In the exemplary embodiment of FIGS. 3A-3B, like the embodiment of FIGS. 2A-2B, each of twelve of the internal angles that at least partially define each lobe portion 341-344 are about 137°, each of the other eight internal angles that at least partially define each protrusion portion 331-334 are about 100°, and each of the eight external angles are about 78°. Also, as shown in FIGS. 3A-3B, strengthening member 300 includes recessed areas 351, 352, 353, 354, 355, 356, 357, and 358. Each recessed area 351-358 extends along the length of the strengthening member 300 from first end 360 to second end 370. A side of an adjacent lobe portion and protrusion portion define each recess along a length of the strengthening member 300.

In the disclosed exemplary embodiment of FIGS. 3A-3B, the cross-sectional lengths of each of the twenty-eight sides are each approximately the same as the cross-sectional lengths of other sides when taken at any cross section along the longitudinal length of the strengthening member 300. However, the cross-sectional length of each side gradually/incrementally increases along the longitudinal axis 350 of the strengthening member 300 from first end 360 to second end 370 to provide the tapered shape. As noted above, the embodiment of FIGS. 3A-3B is exemplary, and therefore all of the contemplated embodiments with variations to the cross-sectional lengths and thicknesses of the sides, and to the angles of the internal and external corner angles of the twenty-eight-cornered cross sections, with twenty internal angles and eight external angles, of the strengthening members in accordance with the present teachings are not shown in the figures, but based on the teachings herein, will be apparent to those of skill in the art.

Figure 4A:
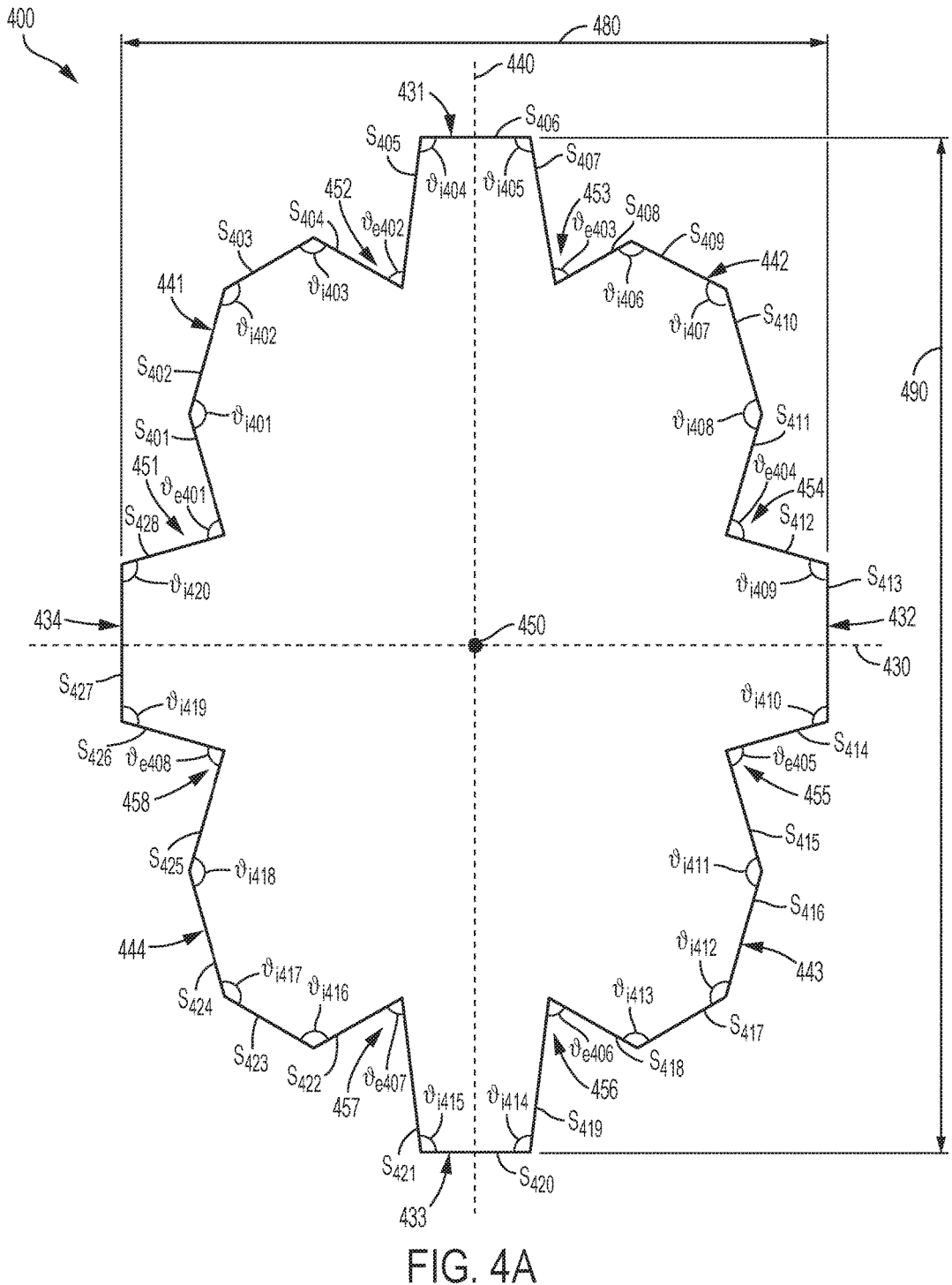
FIGS. 4A-4B are top and perspective views, respectively, of a third exemplary embodiment of a strengthening member having a twenty-eight-cornered cross section with twenty internal angles and eight external angles in accordance with the present teachings.
Figure 4B:
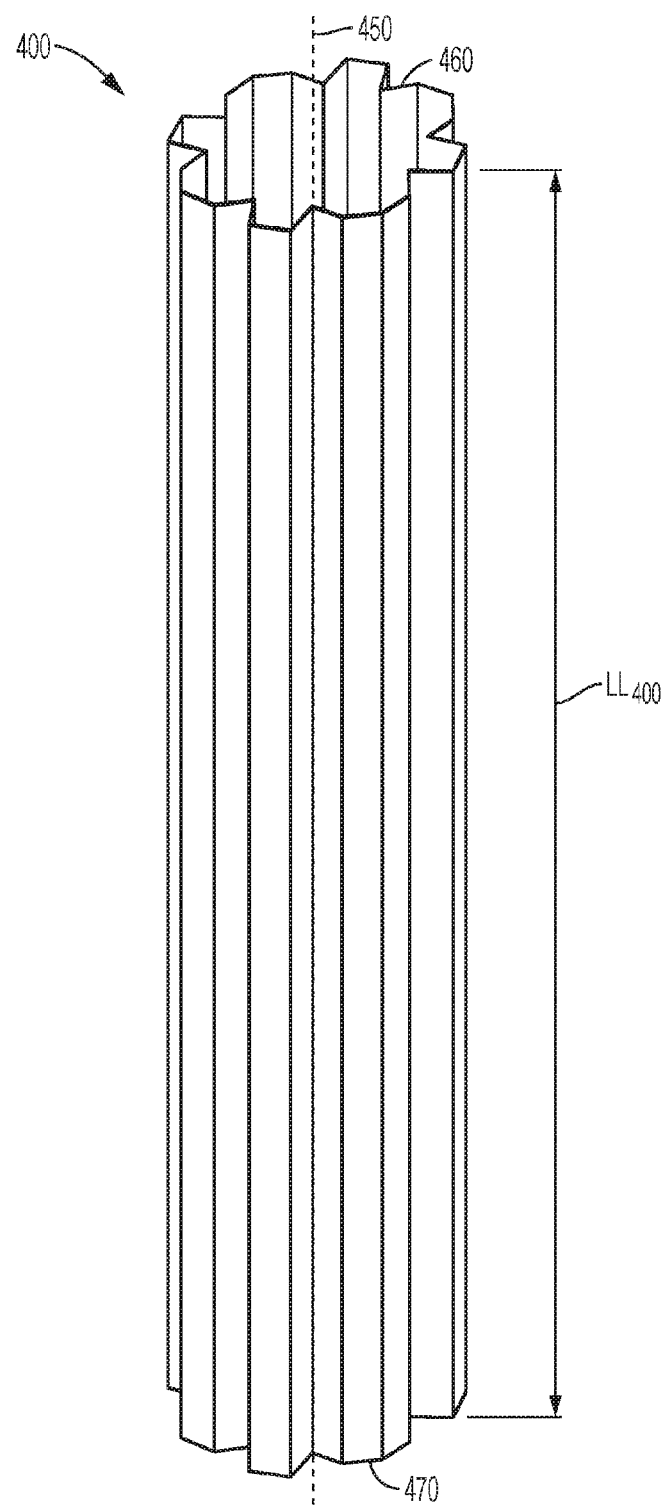

Top and perspective views of an alternative exemplary embodiment of a strengthening member 400 having the twenty-eight-cornered cross section, with twenty internal angles and eight external angles, are illustrated in FIGS. 4A-4B, respectively. The cross section of strengthening member 400 includes four lobe portions 441-444 and four protrusion portions 431-434. Each lobe portion is defined by four sides, for example, sides $S_{401}$-$S_{404}$ define a first lobe portion 441, sides $S_{408}$-$S_{411}$ define a second lobe portion 442, sides $S_{415}$-$S_{418}$ define a third lobe portion 443, and sides $S_{422}$-$S_{425}$ define a fourth lobe portion 444 of the cross section of strengthening member 400. Each protrusion portion is defined by three sides, for example, sides $S_{405}$-$S_{407}$ define a first protrusion portion 431, sides $S_{412}$-$S_{414}$ define a second protrusion portion 432, sides $S_{419}$-$S_{421}$ define a third protrusion portion 433, and sides $S_{426}$-$S_{428}$ define a fourth protrusion portion 434 of strengthening member 400.

Similar to the strengthening member 200, strengthening member 400 has a uniform cross section along a length $LL_{400}$ of the strengthening member 400, from a first end 460 to a second end 470 of the strengthening member 400. However, as shown in FIGS. 4A-4B, strengthening member 400 differs from strengthening members 200 and 300 in that the dimension-to-dimension ratio of the cross section of the strengthening member, taken along transverse axes 430, 440 is not 1:1; rather, the aspect ratio is about 7:10. FIGS. 4A-4B illustrate a strengthening member cross section that has a first length 480 along a first (minor) transverse axis 430 and a second length 490 along a second (major) transverse axis 440, where the second transverse axis 440 is perpendicular to the first transverse axis 430. The aspect ratio of a strengthening member may be defined as [length along minor axis]:[length along major axis] or [first length 480]:[second length 490].

In the exemplary embodiment of FIGS. 4A-4B, the internal corner angles internal angles $\vartheta_{i401}$-$\vartheta_{i403}$, $\vartheta_{i406}$-$\vartheta_{i408}$, $\vartheta_{i411}$-$\vartheta_{i413}$, and $\vartheta_{i416}$-$\vartheta_{i418}$ are not all the same and internal corner angles internal angles $\vartheta_{i404}$, $\vartheta_{i405}$, $\vartheta_{i409}$, $\vartheta_{i410}$, $\vartheta_{i414}$, $\vartheta_{i415}$, $\vartheta_{i419}$, and $\vartheta_{i420}$ are not all the same. In various exemplary embodiments, internal angles $\vartheta_{i401}$, $\vartheta_{i408}$, $\vartheta_{i411}$, and $\vartheta_{i418}$ may each have a first measurement that ranges from about 120° to about 170° or from about 148° to about 152°; internal angles $\vartheta_{i402}$, $\vartheta_{i407}$, $\vartheta_{i412}$, and $\vartheta_{i417}$ may each have a second measurement that ranges from about 120° to about 170° or from about 133° to about 137°; internal angles $\vartheta_{i403}$, $\vartheta_{i406}$, $\vartheta_{i413}$, and $\vartheta_{i416}$ may each have a third measurement that ranges from about 90° to about 140° or from about 120° to about 124°; internal angles $\vartheta_{i404}$, $\vartheta_{i405}$, $\vartheta_{i414}$, and $\vartheta_{i415}$ may each have a fourth measurement that ranges from about 90° to about 140° or from about 96° to about 100°; and internal angles $\vartheta_{i409}$, $\vartheta_{i410}$, $\vartheta_{i419}$, and $\vartheta_{i420}$ may each have a fifth measurement that ranges from about 90° to about 140° or from about 113° to about 117°. For example, as shown in FIG. 4A, internal angles $\vartheta_{i401}$, $\vartheta_{i408}$, $\vartheta_{i411}$, and $\vartheta_{i415}$ have a first measurement, e.g., of about 150°; internal angles $\vartheta_{i402}$, $\vartheta_{i407}$, $\vartheta_{i412}$, and $\vartheta_{i417}$ have a second measurement, e.g., of about 135°; internal angles $\vartheta_{i403}$, $\vartheta_{i406}$, $\vartheta_{i413}$, and $\vartheta_{i416}$ have a third measurement, e.g., of about 122°; internal angles $\vartheta_{i404}$, $\vartheta_{i405}$, $\vartheta_{i414}$, and $\vartheta_{i415}$ have a fourth measurement, e.g., of about 98°; and internal angles $\vartheta_{i409}$, $\vartheta_{i410}$, $\vartheta_{i419}$, and $\vartheta_{i420}$ have a fifth measurement, e.g., of about 115°.

Additionally, the external angles of the exemplary embodiment of FIGS. 4A-4B are not all same. In various exemplary embodiments, external angles $\vartheta_{e404}$, $\vartheta_{e405}$, and $\vartheta_{e408}$ may each have a sixth measurement that ranges from about 70° to about 120° or from about 87° to about 91°; and external angles $\vartheta_{e402}$, $\vartheta_{e403}$, $\vartheta_{e406}$, and $\vartheta_{e407}$ may each have a seventh measurement that ranges from about 50° to about 90° or from about 67° to about 71°. For example, as shown in FIG. 4A, the external angles $\vartheta_{e401}$, $\vartheta_{e404}$, $\vartheta_{e405}$, and $\vartheta_{e408}$, have a sixth measurement, e.g., of about 89°; and external angles $\vartheta_{e402}$, $\vartheta_{e403}$, $\vartheta_{e406}$, and $\vartheta_{e407}$ have a seventh measurement, e.g., of about 69°.

As also shown in FIGS. 4A-4B, the sides of the strengthening member 400 have differing cross-sectional lengths. In addition, the strengthening member 400 of the exemplary embodiment shown in FIGS. 4A-4B includes recessed areas 451-458 spaced around the perimeter of the strengthening member and extending along the length of the strengthening member 400, each recessed area 451-458 extending from first end 460 to second end 470 of strengthening member 400. Sides of adjacent lobe and protrusion portions define each recess along a length of the strengthening member 400. As noted above, the embodiment of FIGS. 4A-4B is exemplary, and therefore all of the contemplated embodiments with variations to the cross-sectional lengths of the sides, thicknesses of the sides, the angles of the internal and external corner angles, and the aspect ratio of the twenty-eight-cornered cross sections, with twenty internal angles and eight external angles, of the strengthening members in accordance with the present teachings are not shown in the figures.

Figure 5A:
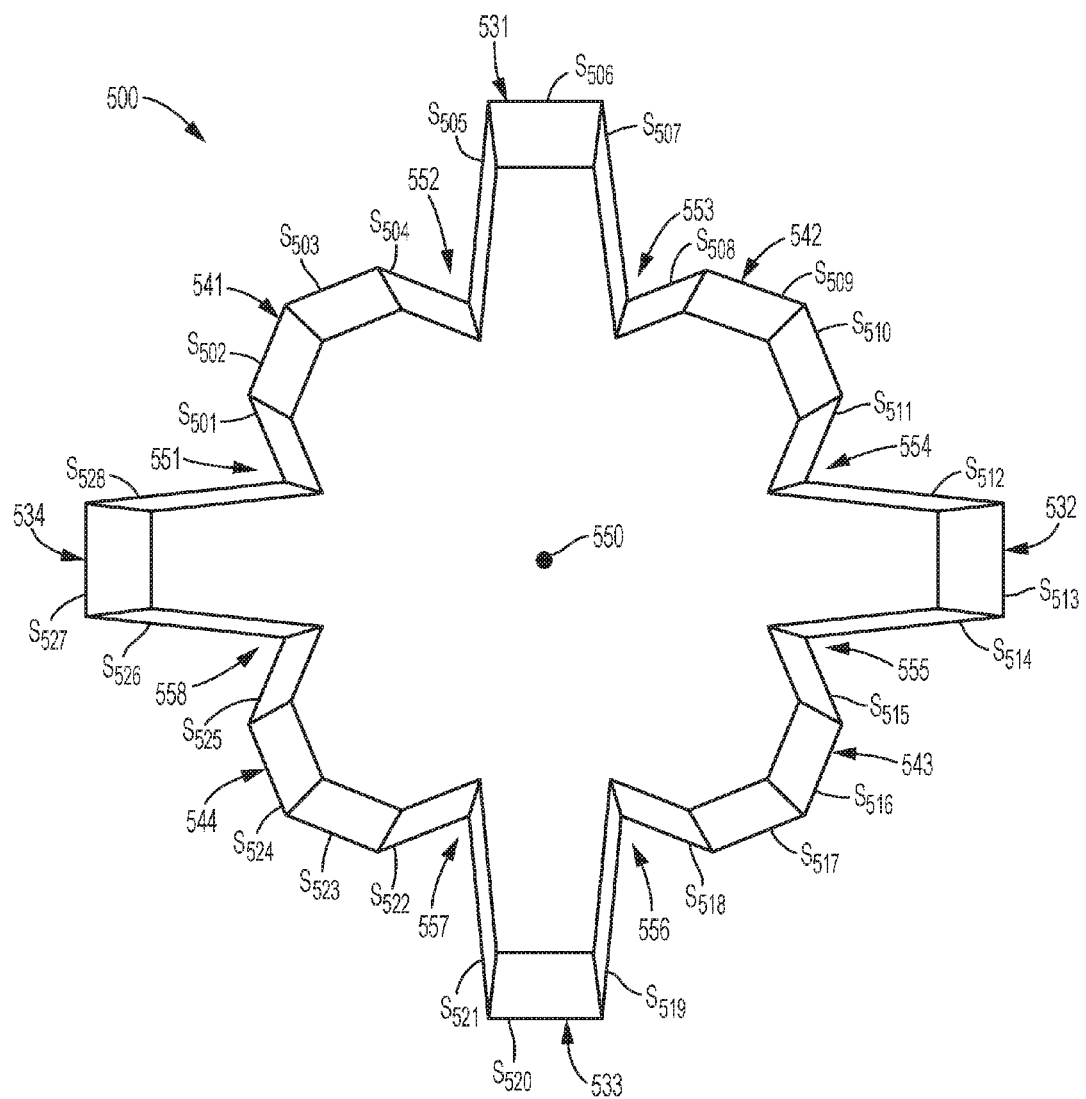
FIGS. 5A-5B are top and perspective views, respectively, of a fourth exemplary embodiment of a strengthening member having a twenty-eight-cornered cross section with twenty internal angles and eight external angles in accordance with the present teachings.
Figure 5B:
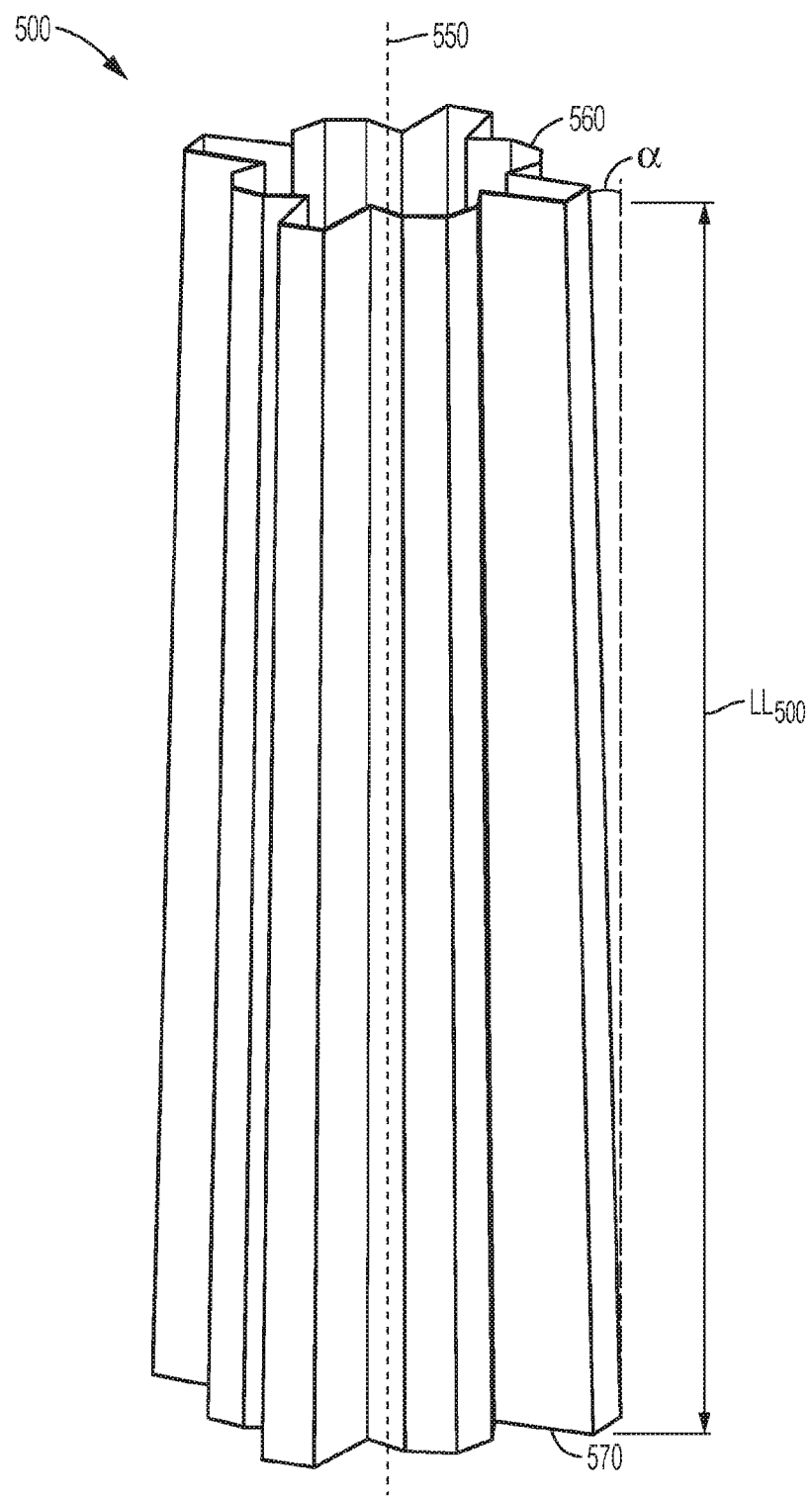

Top and perspective views of an alternative exemplary embodiment of a strengthening member 500 having the twenty-eight-cornered cross section, with twenty internal angles and eight external angles, are illustrated in FIGS. 5A-5B, respectively. The cross section of strengthening member 500 includes four lobe portions and four protrusion portions. Each lobe portion is defined by four sides, for example, sides $S_{501}$-$S_{504}$ define a first lobe portion 541, sides $S_{508}$-$S_{511}$ define a second lobe portion 542, sides $S_{515}$-$S_{518}$ define a third lobe portion 543, and sides $S_{522}$-$S_{525}$ define a fourth lobe portion 544 of the cross section of strengthening member 500. Each protrusion portion is defined by three sides, for example, sides $S_{505}$-$S_{507}$ define a first protrusion portion 531, sides $S_{512}$-$S_{514}$ define a second protrusion portion 532, sides $S_{519}$-$S_{521}$ define a third protrusion portion 533, and sides $S_{526}$-$S_{528}$ define a fourth protrusion portion 534 of strengthening member 500. In addition, strengthening member 500 of the exemplary embodiment shown in FIGS. 5A-5B includes recessed areas 551-558 spaced around the perimeter of the strengthening member and extending along the length $LL_{500}$ of the strengthening member 500, each recessed area 551-558 extending from first end 560 to second end 570 of strengthening member 500.

Similar to the strengthening member 300, strengthening member 500 tapers along its longitudinal axis 550 from a first end 560 of the strengthening member to a second end 570 of the strengthening member 500. Strengthening member 500 tapers along its length at an angle α, which can range from about 1° to about 65°. In various exemplary embodiments, internal angles that at least partially define each lobe portion 541-544 may each range from about 120° to about 160° or from about 138° to about 142°; internal angles that at least partially define each protrusion portion 531-534 may each range from about 70° to about 120° or from about 93° to about 97°; and each external corner angle may range from about 50° to about 100° or from about 71° to about 75°. For example, in the exemplary embodiment of FIGS. 5A-5B, each of twelve of the internal angles that at least partially define each lobe portion 541-544 are about 140°, each of the other eight internal angles that at least partially define each protrusion portion 531-534 are about 95°, and each of the eight external angles are about 73°.

As illustrated in FIG. 5A, the cross-sectional length of each side wall $S_{505}$, $S_{507}$, $S_{512}$, $S_{514}$, $S_{519}$, $S_{521}$, $S_{526}$, and $S_{528}$ is long relative to the cross-sectional length of each of the remaining side walls. This difference in the lengths of the sides, in combination with the angle sizes specified above, provides protrusion portions 531-534 that extend farther outward in a radial direction from the longitudinal axis 550 than the radial extent of the lobe portions 541-544. This type of parameter tuning, i.e., changing the cross-sectional lengths of the sides to increase the extension of the protrusion portions 531-534 relative to the extension of the lobe portions 541-544 can increase the internal volume of the protrusion portions 531-534, thereby providing internal cavities that are relatively larger, deeper, and/or cavities with greater than 180 degree protection in the form of longitudinal side walls for other vehicle components that may require extra protection and separation. Such vehicle components may include, for example, brake line(s), pipe(s), electric wire(s), cable(s), and/or seatbelt(s). Disposition of the vehicle components within the completely enclosed side walls of the strengthening member function as a shelter to protect the other vehicle components from being damaged, for example, during vehicle impact events. Additionally, increasing the extension of one or more protrusion portions can allow the strengthening member to be connected or otherwise coupled to adjacent component(s), for example, by bridging the distance between components without enlarging the entire cross section of the strengthening member. Also, increasing the extension of one or more protrusion portions may be advantageous when the design space has relatively more room in directions along transverse axes that are aligned with the protrusion portions, but is restricted in the other radial directions (e.g., the directions in alignment with the transverse axes in alignment with the lobe portions).

Figure 6A:
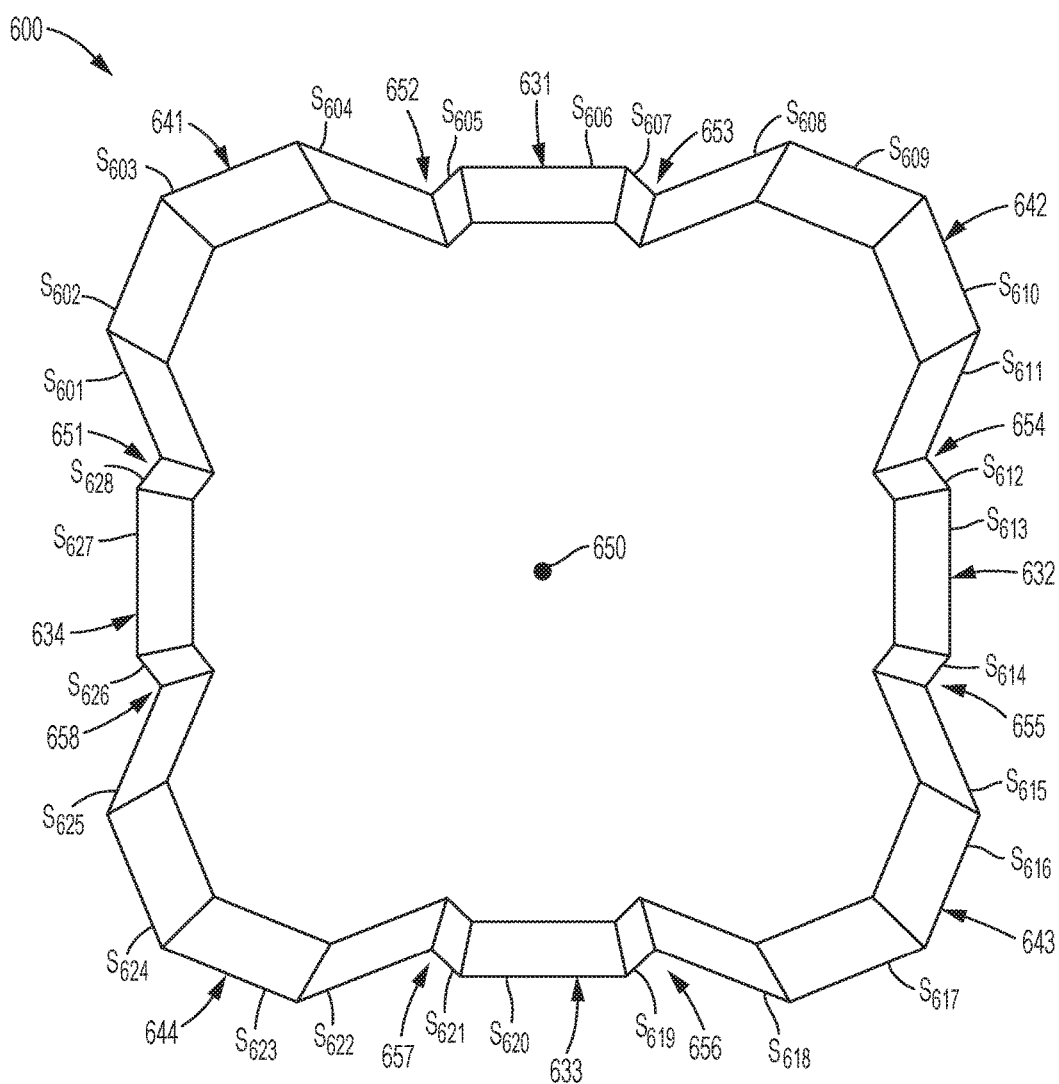
FIGS. 6A-6B are top and perspective views, respectively, of a fifth exemplary embodiment of a strengthening member having a twenty-eight-cornered cross section with twenty internal angles and eight external angles in accordance with the present teachings.
Figure 6B:
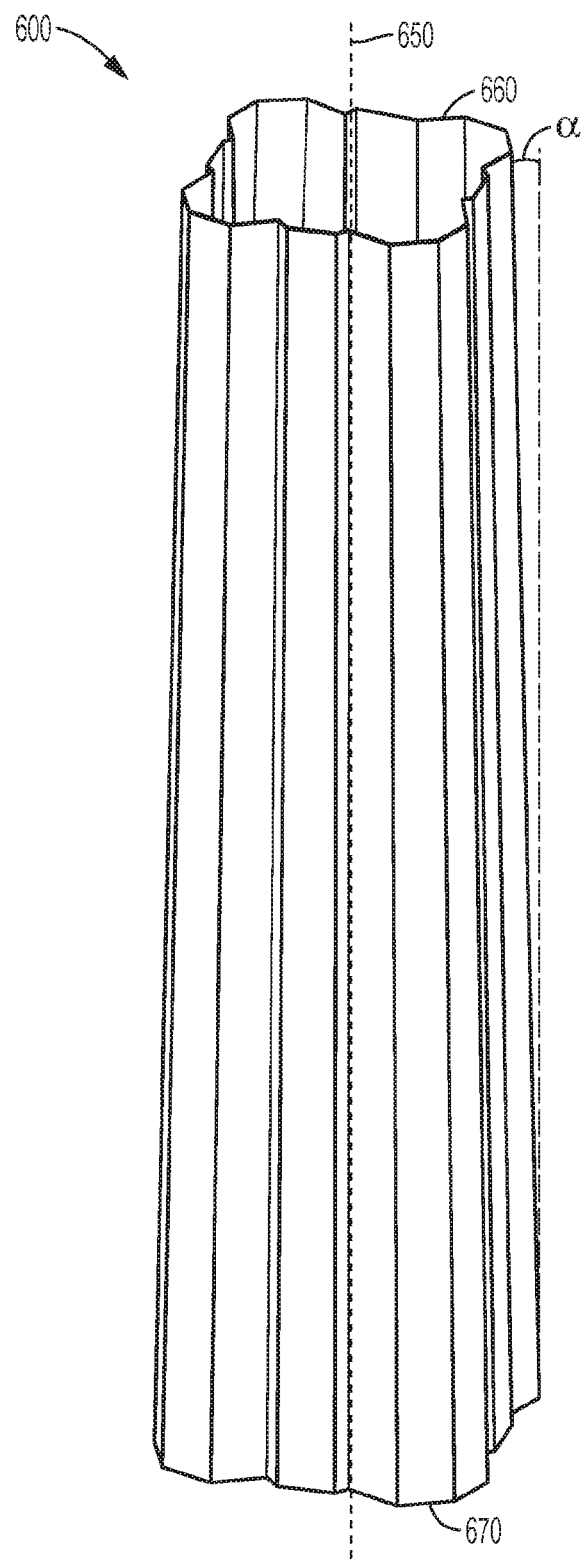

Top and perspective views of an alternative exemplary embodiment of a strengthening member 600 having the twenty-eight-cornered cross section, with twenty internal angles and eight external angles, are illustrated in FIGS. 6A-6B, respectively. The cross section of strengthening member 600 includes four lobe portions and four protrusion portions. Each lobe portion is defined by four sides, for example, sides $S_{601}$-$S_{604}$ define a first lobe portion 641, sides $S_{608}$-$S_{611}$ define a second lobe portion 642, sides $S_{615}$-$S_{618}$ define a third lobe portion 643, and sides $S_{622}$-$S_{625}$ define a fourth lobe portion 644 of the cross section of strengthening member 600. Each protrusion portion is defined by three sides, for example, sides $S_{605}$-$S_{607}$ define a first protrusion portion 631, sides $S_{612}$-$S_{614}$ define a second protrusion portion 632, sides $S_{619}$-$S_{621}$ define a third protrusion portion 633, and sides $S_{626}$-$S_{628}$ define a fourth protrusion portion 634 of strengthening member 600. In addition, the strengthening member 600 of the exemplary embodiment shown in FIGS. 6A-6B includes recessed areas 651-658 spaced around the perimeter of the strengthening member and extending along the length of the strengthening member 600, each recessed area 651-658 extending from first end 660 to second end 670 of strengthening member 600.

Similar to the strengthening members 300 and 500, strengthening member 600 tapers along its longitudinal axis 650 from a first end 660 of the strengthening member to a second end 670 of the strengthening member 600. The strengthening member 600 tapers along its length at an angle α, which can range from about 1° to about 65°. In various exemplary embodiments, internal angles that at least partially define each lobe portion 641-644 may each range from about 90° to about 130° or from about 134° to about 138°; internal angles that at least partially define each protrusion portion 631-634 may each range from about 110° to about 150° or from about 133° to about 137°; and each external corner angle may range from about 50° to about 100° or from about 110° to about 114°. For example, in the exemplary embodiment of FIGS. 6A-6B, each of twelve of the internal angles that at least partially define each lobe portion 641-644 are about 136°, each of the other eight internal angles that at least partially define each protrusion portion 631-634 are about 135°, and each of the eight external angles are about 112°.

As illustrated in FIG. 6A, the cross-sectional length of each side wall $S_{605}$, $S_{607}$, $S_{612}$, $S_{614}$, $S_{619}$, $S_{621}$, $S_{626}$, and $S_{628}$ is short relative to the cross-sectional length of each of the remaining side walls. This difference in the lengths of the sides, in combination with the angle sizes specified above, provides lobe portions 641-644 that extend farther outward in a radial direction from the longitudinal axis 550 than the radial extent of the protrusion portions 631-634. Accordingly, the internal cavity defined by the protrusion portions 631-634 is relatively smaller/shallow. This type of parameter tuning, i.e., changing the cross-sectional lengths of certain sides to decrease the extension of the protrusion portions 631-634 relative to the extension of the lobe portions 641-644 can decrease the internal volume of the protrusion portions 631-634, thereby providing a cross section that may be more compatible for fitting with existing vehicle components. Also, decreasing the extension of one or more protrusion portions may be advantageous when the design space has relatively less room in directions along transverse axes that are aligned with the protrusion portions, but has relatively more room in the other radial directions (e.g., the directions in alignment with the transverse axes in alignment with the lobe portions).

Figure 7A:
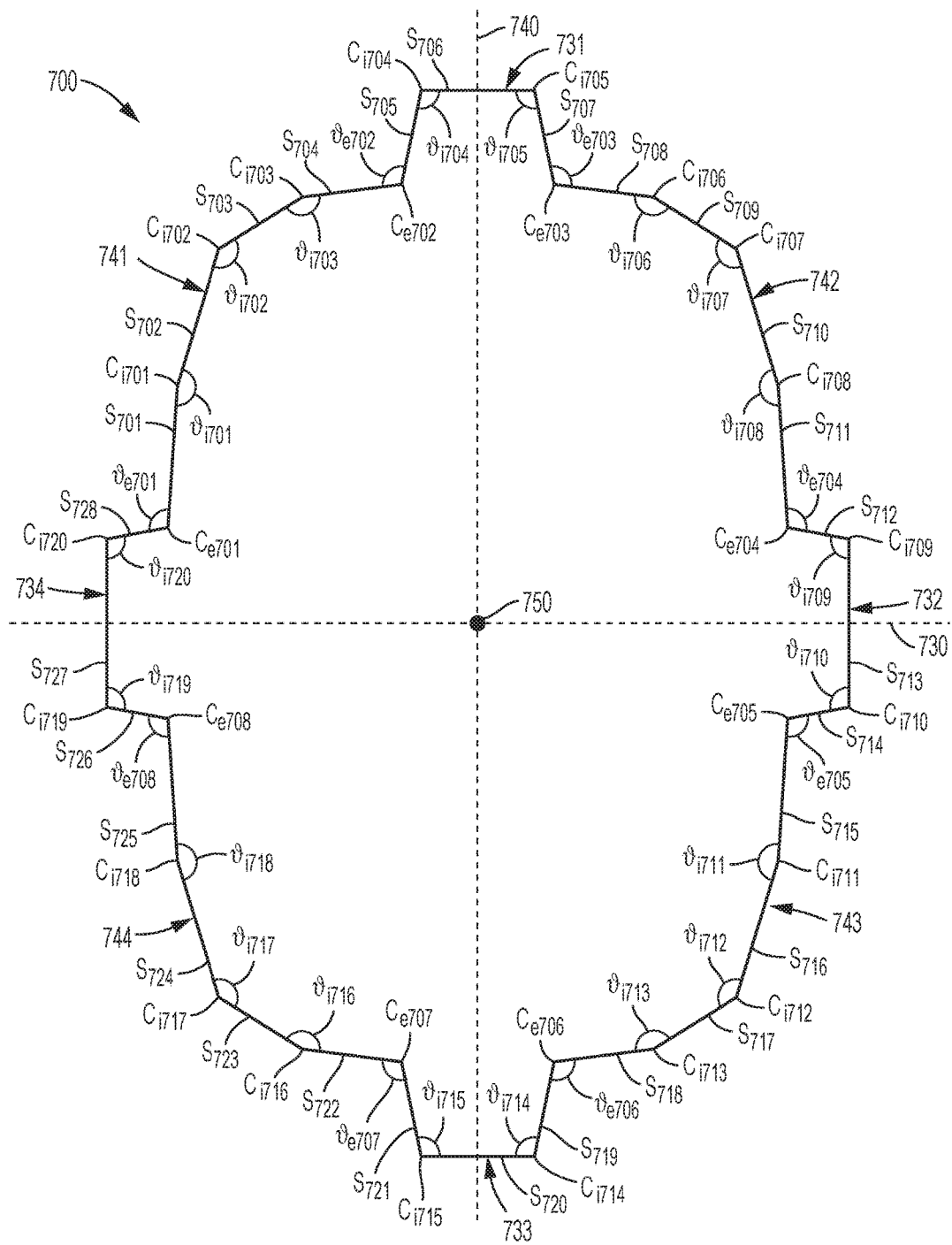
FIGS. 7A-7B are top and perspective views, respectively, of a sixth exemplary embodiment of a strengthening member having a twenty-eight-cornered cross section with twenty internal angles and eight external angles in accordance with the present teachings.
Figure 7B:
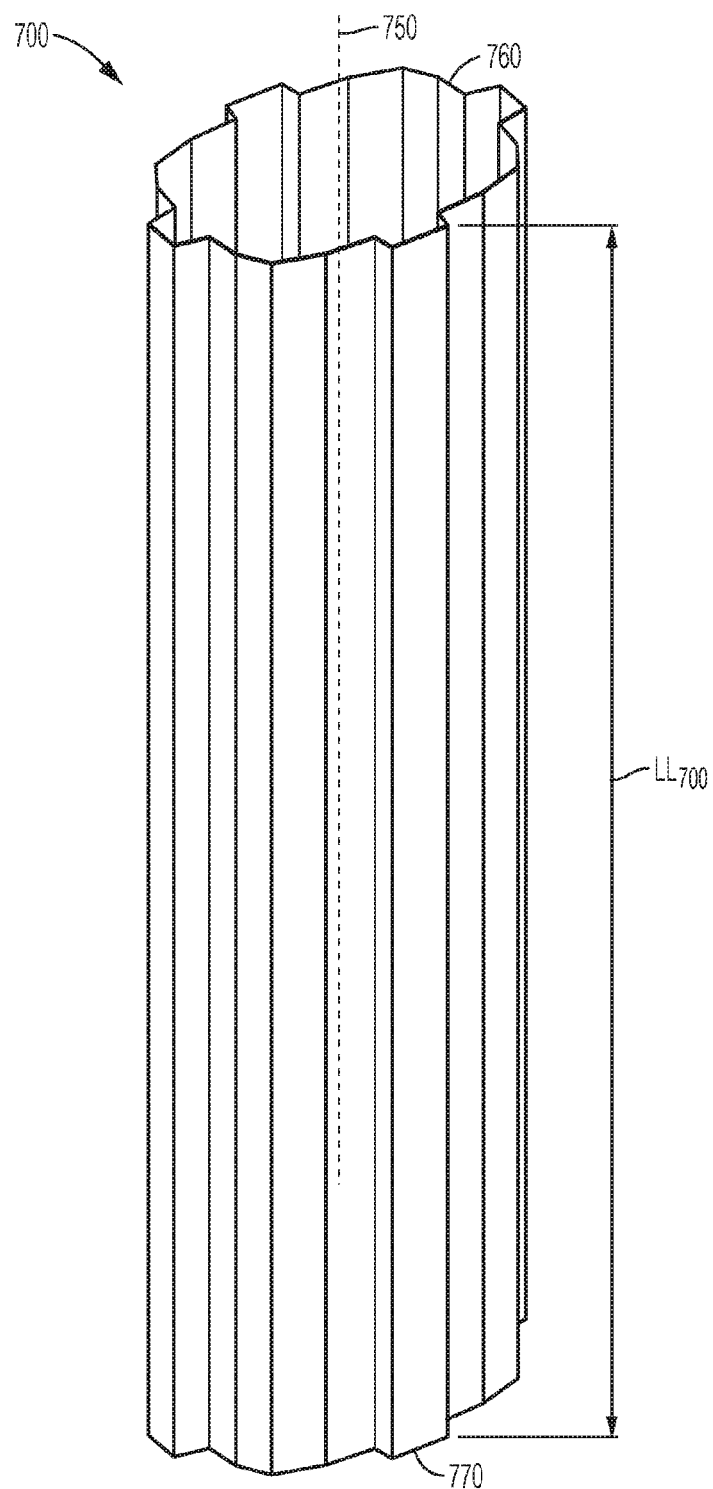

Top and perspective views of an alternative exemplary embodiment of a strengthening member 700 having a twenty-eight-cornered cross section, with twenty internal angles and eight external angles, are illustrated in FIGS. 7A-7B, respectively. Strengthening member 700 has twenty-eight corners $C_{i701}$-$C_{i720}$ and $C_{e701}$-$C_{e708}$, and twenty-eight side walls $S_{701}$-$S_{728}$. Twenty of the corners are internal angle corners $C_{i701}$-$C_{i720}$ and eight of the corners are external angle corners $C_{e701}$-$C_{e708}$. Strengthening member 700 also has a first transverse axis 730, a second transverse axis 740, and a longitudinal axis 750. The dimension-to-dimension ratio of the cross section of the strengthening member 700, taken along transverse axes 730, 740 is not 1:1; rather, the aspect ratio is about 7:10.

In the exemplary embodiment of FIGS. 7A-7B, the internal corner angles $\vartheta_{i701}$-$\vartheta_{i703}$, $\vartheta_{i706}$-$\vartheta_{i708}$, $\vartheta_{i711}$-$\vartheta_{i713}$, and $\vartheta_{i716}$-$\vartheta_{i718}$ are not all the same and internal corner angles $\vartheta_{i704}$, $\vartheta_{i705}$, $\vartheta_{i709}$, $\vartheta_{i710}$, $\vartheta_{i714}$, $\vartheta_{i715}$, $\vartheta_{i719}$, and $\vartheta_{i720}$ are not all the same. In various exemplary embodiments, internal angles $\vartheta_{i701}$, $\vartheta_{i708}$, $\vartheta_{i711}$, and $\vartheta_{i718}$ may each have a first measurement that ranges from about 145° to about 175° or from about 163° to about 167°; internal angles $\vartheta_{i702}$, $\vartheta_{i707}$, $\vartheta_{i712}$, and $\vartheta_{i717}$ may each have a second measurement that ranges from about 120° to about 160° or from about 138° to about 142°; internal angles $\vartheta_{i703}$, $\vartheta_{i706}$, $\vartheta_{i713}$, and $\vartheta_{i716}$ may each have a third measurement that ranges from about 135° to about 175° or from about 152° to about 156°; internal angles $\vartheta_{i704}$, $\vartheta_{i705}$, $\vartheta_{i714}$, and $\vartheta_{i715}$ may each have a fourth measurement that ranges from about 95° to about 120° or from about 98° to about 102°; and internal angles $\vartheta_{i709}$, $\vartheta_{i710}$, $\vartheta_{i719}$, and $\vartheta_{i720}$ may each have a fifth measurement that ranges from about 95° to about 120° or from about 105° to about 107°.

For example, as shown in FIG. 7A, internal angles $\vartheta_{i701}$, $\vartheta_{i708}$, $\vartheta_{i711}$, and $\vartheta_{i718}$ have a first measurement, e.g., of about 165°; internal angles $\vartheta_{i702}$, $\vartheta_{i707}$, $\vartheta_{i712}$, and $\vartheta_{i717}$ have a second measurement, e.g., of about 140°; internal angles $\vartheta_{i703}$, $\vartheta_{i706}$, $\vartheta_{i713}$, and $\vartheta_{i716}$ have a third measurement, e.g., of about 154°; internal angles $\vartheta_{i704}$, $\vartheta_{i705}$, $\vartheta_{i714}$, and $\vartheta_{i715}$ have a fourth measurement, e.g., of about 100°; and internal angles $\vartheta_{i709}$, $\vartheta_{i710}$, $\vartheta_{i719}$, and $\vartheta_{i720}$ have a fifth measurement, e.g., of about 107°.

Additionally, in the exemplary embodiment of FIGS. 7A-7B, the external angles are not all same. In various exemplary embodiments, external angles $\vartheta_{e701}$, $\vartheta_{e704}$, $\vartheta_{e705}$, and $\vartheta_{e708}$ may each have a fifth measurement that ranges from about 95° to about 140°; and external angles $\vartheta_{e702}$, $\vartheta_{e703}$, $\vartheta_{e706}$, and $\vartheta_{e707}$ may each have a sixth measurement that ranges from about 95° to about 130° (different from the fifth measurement). For example, as shown in FIG. 7A, the external angles $\vartheta_{e701}$, $\vartheta_{e704}$, $\vartheta_{e705}$, and $\vartheta_{e708}$, have a sixth measurement, e.g., of about 116°; and external angles $\vartheta_{e702}$, $\vartheta_{e703}$, $\vartheta_{e706}$, and $\vartheta_{e707}$ have a seventh measurement, e.g., of about 108°.

Although shown with its longitudinal axis 750 positioned substantially vertically in FIG. 7B, when strengthening member 700 (as well as all of the other various embodiments in accordance with the present teachings) is installed within a vehicle, the longitudinal axis 750 of the strengthening member may be oriented substantially horizontally. In this position, first transverse axis 730 may be oriented substantially horizontally and second transverse axis 740 may be oriented substantially vertically, as shown in FIG. 7A. When installed in such a position, the shape of strengthening member 700 facilitates the reduction or prevention of moisture collecting or pooling along portions of the walls of strengthening member 700. For example, certain conventional strengthening members whose walls form adjacent external angles of 90 degrees or form rectangular, square, or U-shaped recesses or depressions may collect moisture or permit moisture to pool in the recesses, increasing the possibility of weakening of the strengthening member via rusting, stripping, cracking, etc. (i.e., any form of oxidation or other chemical or physical distortion which the material of manufacture of the strengthening member may be more susceptible to due to the presence of moisture).

In contrast, strengthening member 700 does not include a recessed portion in which liquids or moisture can remain for a long period of time. In particular, each of the internal angles $\vartheta_{i701}$-$\vartheta_{i720}$ and external angles $\vartheta_{e701}$-$\vartheta_{e708}$ have been selected such that the walls of strengthening member 700 are angled relative to one another to promote shedding of any moisture or fluid that falls within any recessed portion of the strengthening member. For example, as shown in FIGS. 7A and 7B, strengthening member 700 includes internal angles $\vartheta_{i701}$-$\vartheta_{i720}$ that are obtuse, and external angles $\vartheta_{e701}$-$\vartheta_{e708}$ that are obtuse. As a result, side walls $S_{701}$-$S_{728}$ are sloped/angled such that fluid impinging or collecting on side walls $S_{701}$-$S_{728}$ will run off the exterior of the strengthening member 700 due in part or in whole to gravitational forces.

Top and perspective views of an alternative exemplary embodiment of a strengthening member 800 having a twenty-eight-cornered cross section, with twenty internal angles and eight external angles, are illustrated in FIGS.

8A-8B, respectively. Strengthening member 800 has twenty-eight corners and twenty-eight side walls $S_{801}$-$S_{828}$. Twenty of the corners are internal angle corners and eight of the corners are external angle corners. Strengthening member 800 also has a first transverse axis 830, a second transverse axis 840, and a longitudinal axis 850. The dimension-to-dimension ratio of the cross section of the strengthening member 800, taken along transverse axes 830, 840 is 1:1.

In various exemplary embodiments, internal angles that at least partially define each lobe portion 841-844 may each range from about 130° to about 175° or from about 151° to about 155°; internal angles that at least partially define each protrusion portion 831-834 may each range from about 95° to about 130° or from about 96° to about 100°; and each external corner angle may range from about 95° to about 130° or from about 94° to about 98°. For example, in the exemplary embodiment of FIGS. 8A-8B, each of twelve of the internal angles that at least partially define each lobe portion 841-844 are about 153°, each of the other eight internal angles that at least partially define each protrusion portion 831-834 are about 98°, and each of the eight external angles are about 96°.

Figure 8A:
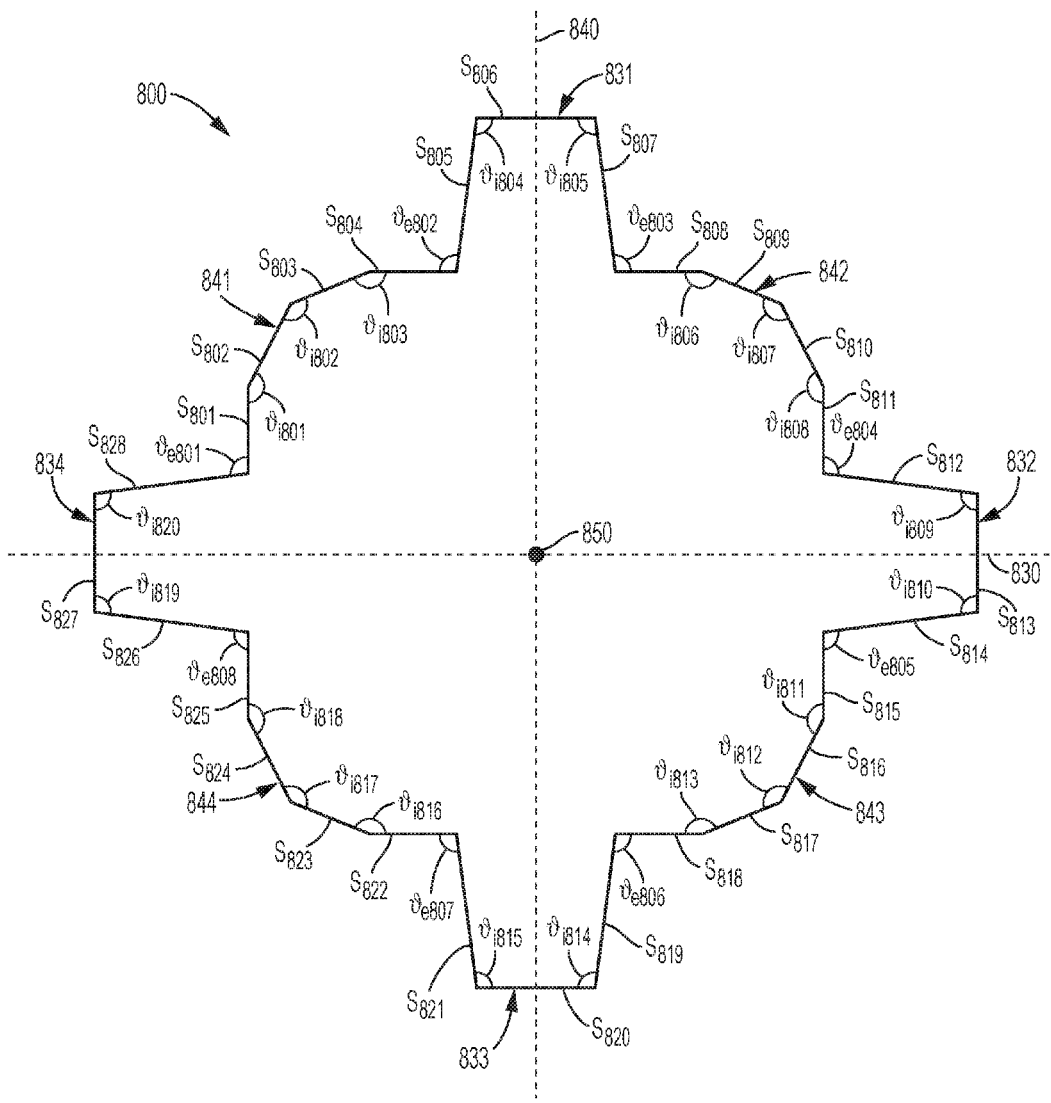
FIGS. 8A-8B are top and perspective views, respectively, of a seventh exemplary embodiment of a strengthening member having a twenty-eight-cornered cross section with twenty internal angles and eight external angles in accordance with the present teachings.
Figure 8B:
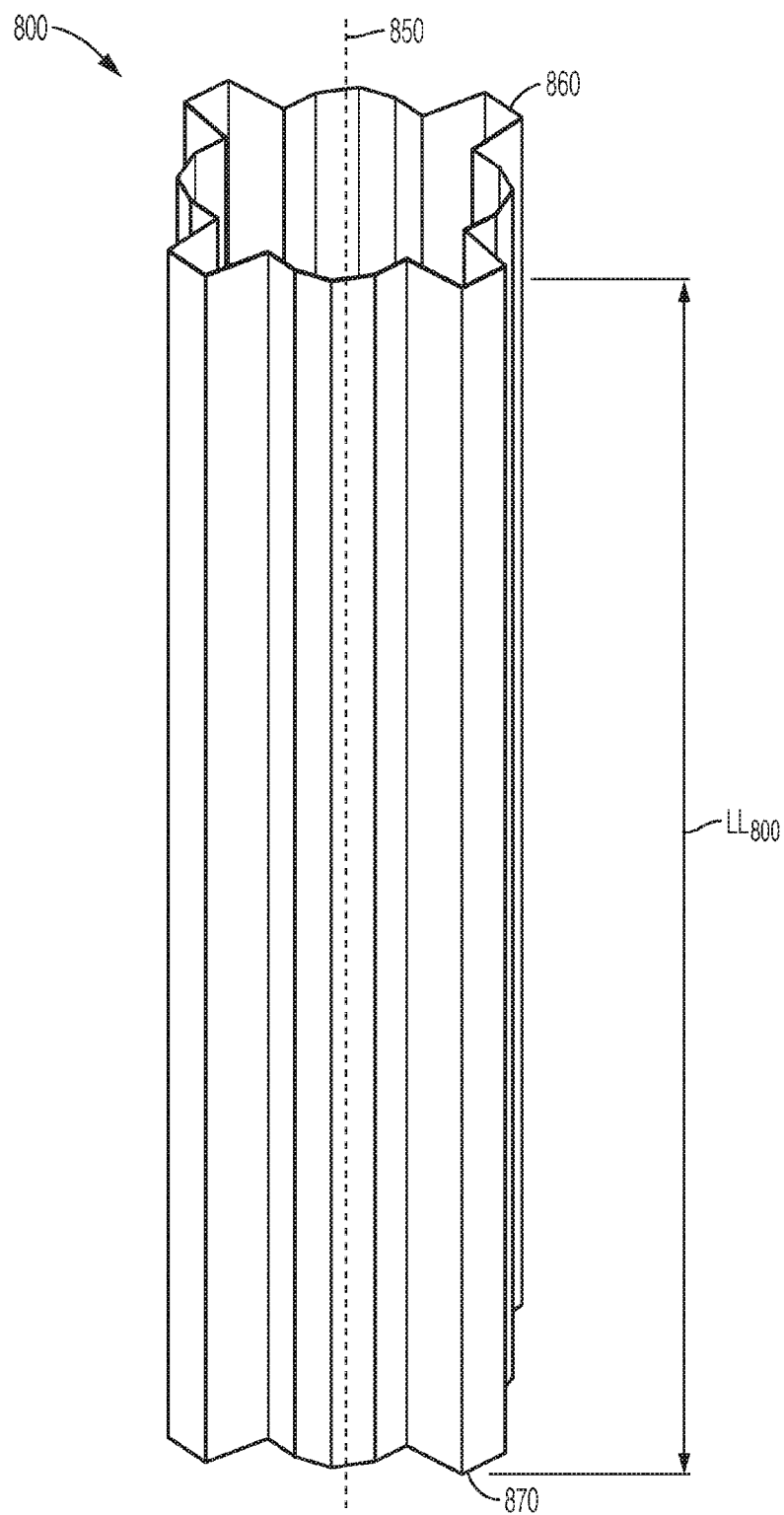

Although shown with its longitudinal axis 850 positioned substantially vertically in FIG. 8B, when strengthening member 800 (as well as all of the other various embodiments in accordance with the present teachings) is installed within a vehicle, longitudinal axis 850 of strengthening member may be oriented substantially horizontally. In this position, first transverse axis 830 may be oriented substantially horizontally and second transverse axis 840 may be oriented substantially vertically, as shown in FIG. 8A. When installed in such a position, the shape of strengthening member 800 facilitates the reduction or prevention of moisture collecting or pooling along portions of the walls of strengthening member 800. For example, certain conventional strengthening members whose walls form adjacent external angles of 90 degrees or form rectangular, square, or U-shaped recesses or depressions may collect moisture or permit moisture to pool in the recesses, increasing the possibility of weakening of the strengthening member via rusting, stripping, cracking, etc. (i.e., any form of oxidation or other chemical or physical distortion which the material of manufacture of the strengthening member may be more susceptible to due to the presence of moisture).

In contrast, strengthening member 800 does not include a recessed portion in which liquids or moisture can remain for a long period of time. In particular, each of the internal angles $\vartheta_{i801}$-$\vartheta_{i820}$ and external angles $\vartheta_{e801}$-$\vartheta_{e808}$ have been selected such that the walls of strengthening member 800 are angled relative to one another to promote shedding of any moisture or fluid that falls within any recessed portion of the strengthening member. For example, as shown in FIGS. 8A and 8B, strengthening member 800 includes internal angles $\vartheta_{i801}$-$\vartheta_{i820}$ that are obtuse, and external angles $\vartheta_{e801}$-$\vartheta_{e808}$ that are obtuse. As a result, side walls $S_{801}$-$S_{828}$ are sloped/angled side walls in such a manner that fluid impinging or collecting on side walls $S_{801}$-$S_{828}$ will run off the exterior of the strengthening member 800 due in part or in whole to gravitational forces. Thus, strengthening member 800 provides an exemplary embodiment of a strengthening member in accordance with the present disclosure that can promote moisture shedding and also provide more space around the exterior of the strengthening member in which other vehicle components may be permanently, temporarily or periodically fitted, located, or otherwise disposed.

More generally, the various exemplary embodiments of the present teachings contemplate, for example, strengthening members with corners having different bend radii, with non-uniform cross sections, having non-symmetrical shapes, with sides having variable thicknesses, and/or having variable tapered sides. Various additional exemplary embodiments contemplate strengthening members that are bent and/or curved. Moreover, to further adjust a member's folding pattern and/or peak load capacity, various additional exemplary embodiments also contemplate strengthening members having trigger holes, flanges, and/or convolutions as would be understood by those of ordinary skill in the art. Combinations of one or more of the above described variations are also contemplated.

As discussed and embodied herein, the cross-sectional lengths $L_1$-$L_{28}$ and thicknesses $T_1$-$T_{28}$ of the sides of a strengthening member are tunable parameters of the strengthening member. The cross-sectional lengths $L_1$-$L_{28}$ and thicknesses $T_1$-$T_{28}$ of the sides may be tuned to provide desired characteristics in the strengthening member. For example, in the embodiment of FIGS. 3A-3B, these parameters are tuned to provide strengthening member 300 with side walls and corners that are tapered along the longitudinal length of strengthening member 300.

As discussed and embodied herein, the aspect ratio of a cross section of a strengthening member is a tunable parameter of the strengthening member in accordance with the present teachings. The aspect ratio of a cross section of a strengthening member may be tuned to provide desired characteristics in the strengthening member. For example, in the embodiment of FIGS. 4A-4B, these parameters are tuned to provide strengthening member 400 with two cross-sectional dimensions along perpendicularly oriented transverse axes that are different in length.

As discussed and embodied herein, the cross sectional lengths $L_1$-$L_{28}$ of the sides $S_1$-$S_{28}$ of the cross section of a strengthening member are tunable parameters in accordance with the present teachings. The lengths $L_1$-$L_{28}$ of the sides $S_1$-$S_{28}$ of a strengthening member may be tuned to provide desired characteristics in the strengthening member. For example, in the embodiment of FIGS. 5A-5B these parameters are tuned to provide strengthening member 500 with protrusion portions 531-534 that extend farther outward in a radial direction from the longitudinal axis 550 than the radial extent of the lobe portions 541-544.

As discussed and embodied herein, the twenty internal angles $\vartheta_{i1}$-$\vartheta_{i20}$ and eight external angles $\vartheta_{e1}$-$\vartheta_{e8}$ are tunable parameters of the strengthening member. The internal angles $\vartheta_{i1}$-$\vartheta_{i20}$ and external angles $\vartheta_{e1}$-$\vartheta_{e8}$ may be tuned to provide desired characteristics in the strengthening member. For example, in the embodiment of FIGS. 6A-6B, these parameters are tuned to provide strengthening member 600 with lobe portions 631-634 that extend farther outward in a radial direction from the longitudinal axis 550 than the radial extent of the protrusion portions 641-644. Additionally, internal angles $\vartheta_{i1}$-$\vartheta_{i20}$ and external angles $\vartheta_{e1}$-$\vartheta_{e8}$ may be tuned to promote moisture shedding, as demonstrated in the embodiments of FIGS. 7A-7B and 8A-8B.

As discussed and embodied herein, multiple tunable parameters—including but not limited to the cross-sectional lengths $L_1$-$L_{28}$ and thicknesses $T_1$-$T_{28}$ of the sides of a strengthening member, the aspect ratio of a cross section of the strengthening member, the internal angles $\vartheta_{i1}$-$\vartheta_{i20}$ and external angles $\vartheta_{e1}$-$\vartheta_{e8}$ of the corners, the size of the protrusion portions, and the size of the lobe portions—may all be tuned within the same strengthening member to provide desired characteristics in the strengthening member.

In the various illustrated exemplary embodiments of FIGS. 2A-8B, the strengthening members may have a one-piece construction. As stated above, the one-piece constructions shown in FIGS. 2A through 8B are exemplary only and the present teachings contemplate strengthening members of other constructions such as two-piece construction or having three or more pieces.

To demonstrate the improved strength and performance features of a twenty-eight-cornered cross section having twenty internal angles and eight external angles in accordance with the present teachings, the inventors compared various existing and conventional strengthening member cross section designs to cross sections based on the designs disclosed herein. Exemplary strengthening members were modeled and crash simulation runs were conducted, as shown and described below with reference to FIGS. 9-13.

Figure 9:
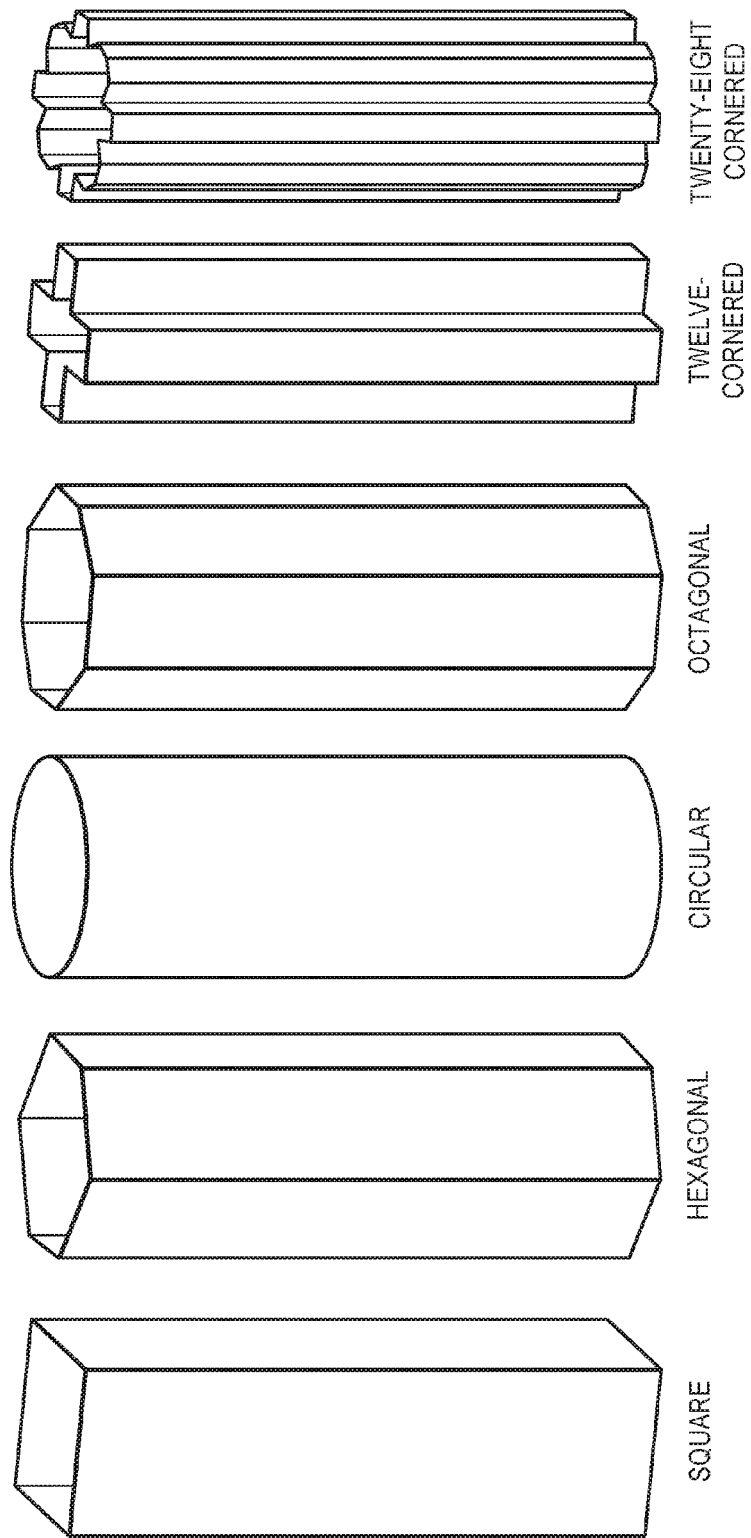
FIG. 9 illustrates strengthening members of various cross sections having substantially the same thickness, substantially the longitudinal length, and cross-sectional dimensions along perpendicularly oriented transverse axes with substantially the same lengths.

Strengthening members having varying cross-sectional shape and having the same mass, thickness, and longitudinal length were modeled as illustrated in FIG. 9. Crash simulations were then run for each member to simulate an impact with the same rigid mass (e.g., an impactor), impact speed, and initial kinetic energy.

Figure 10:
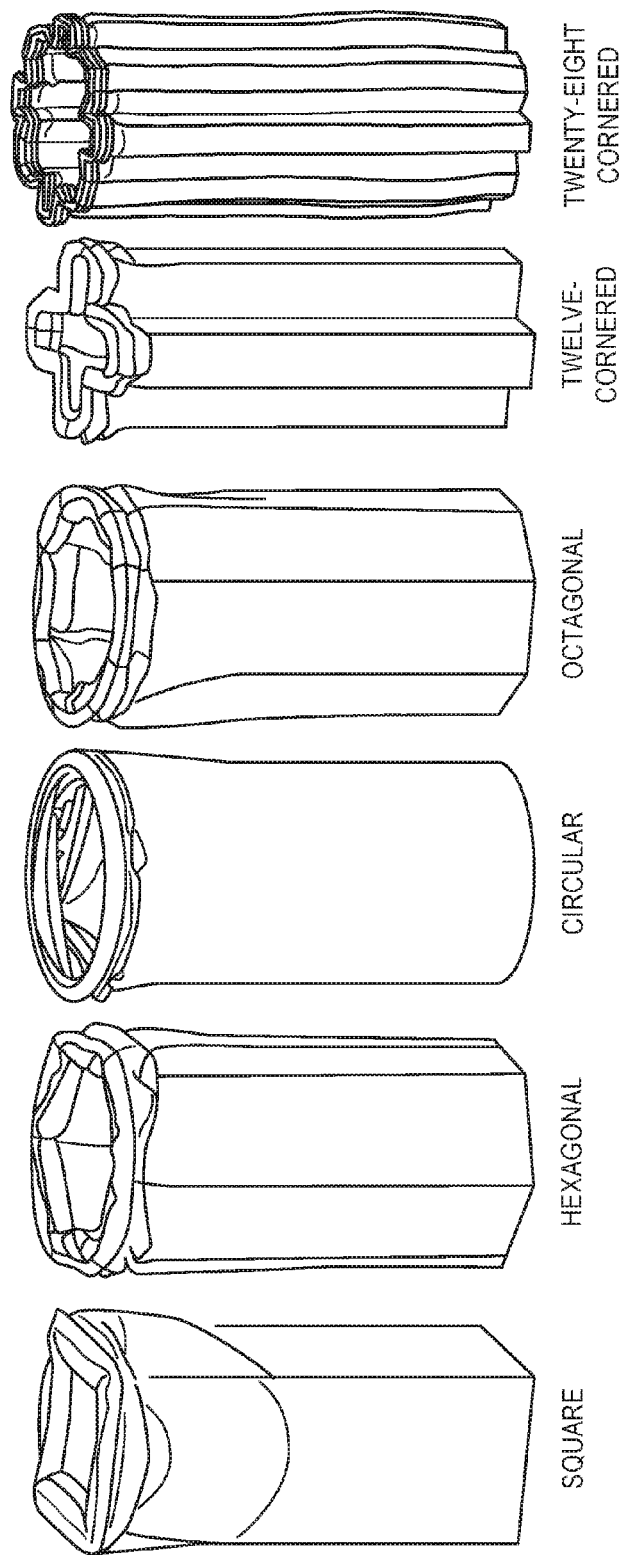
FIG. 10 illustrates an exemplary quasi-static axial collapse of the strengthening members shown in FIG. 9.

FIG. 10 shows strengthening members which have undergone a simulated quasi-static crush. During each quasi-static crush the impact speed is slow (e.g., 1 in/min). An impactor compresses the strengthening members with a controlled displacement. Therefore, all strengthening members reach the same crush distance with the same crush time. Thus, subjecting multiple strengthening members to a quasi-static crush provides a comparison of the folding length and the crush stability of the strengthening members. As shown in FIG. 10, the twenty-eight-cornered cross section in accordance with the present teachings demonstrated stable and progressive axial collapse, as well as the smallest folding length.

Figure 11:
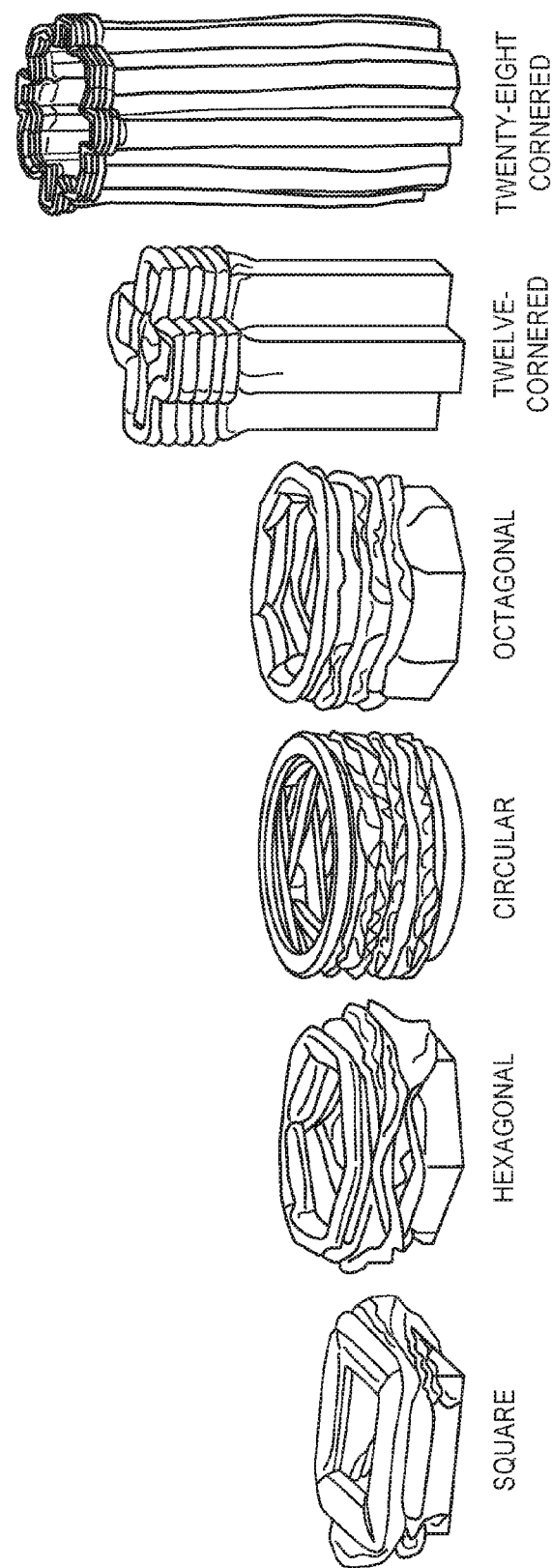
FIG. 11 illustrates an exemplary dynamic crush of the strengthening members shown in FIG. 9.

FIG. 11 shows strengthening members which have undergone a simulated dynamic crush. During each dynamic crush, the impactor is propelled by a gas gun with a designated mass and initial impact velocity which creates a designated initial kinetic energy. The initial kinetic energy crushes the strengthening members. Performance of each strengthening member can be compared by measuring the crush distance and specific energy absorption of each strengthening member. As shown in FIG. 11, the twenty-eight-cornered cross section in accordance with the present teachings also demonstrated the shortest crush distance.

Figure 12:
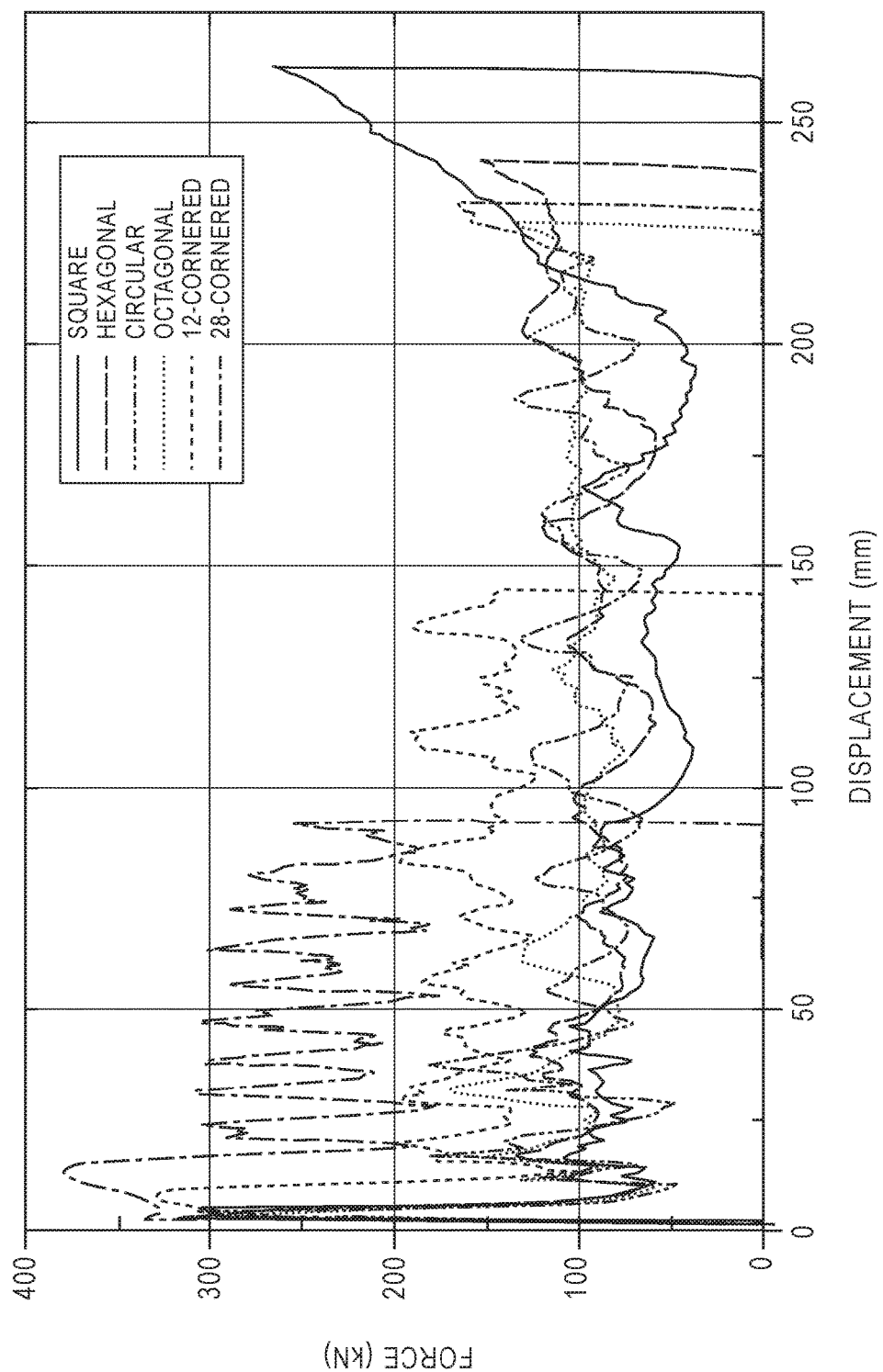
FIG. 12 is a graph of the dynamic crush force and associated crush distance for the exemplary strengthening members shown in FIG. 9.

FIG. 12 illustrates the dynamic crush force (in kN) and associated axial crush distance (in mm) for the simulated dynamic crush, exerted axially on the exemplary strengthening members shown in FIG. 9. As shown in FIG. 12, the strengthening member having a twenty-eight-cornered cross section could sustain a much higher crushing force for a given resulting crushing distance as compared with the square, hexagonal, circular, octagonal, and twelve-cornered cross sections. Specifically, the twenty-eight-cornered cross section in accordance with the present teachings achieved about a 145% increase in averaged crush force and/or crash energy absorption as compared with the octagon. A person having ordinary skill in the art would have expected that a strengthening member with four lobes and four protrusions in accordance with the present disclosure would have performed similarly to a strengthening member with a corrugated cross section, which is known to have relatively poor energy absorption and undesirably open in a flower-like fashion when crushed, as evidenced by, for example, the strengthening members with corrugated cross sections shown in U.S. Pat. No. 8,459,726, which is hereby incorporated by reference. Accordingly, the substantially increased energy absorption provided by the strengthening member with a twenty-eight cornered was an unexpected result.

Figure 13:
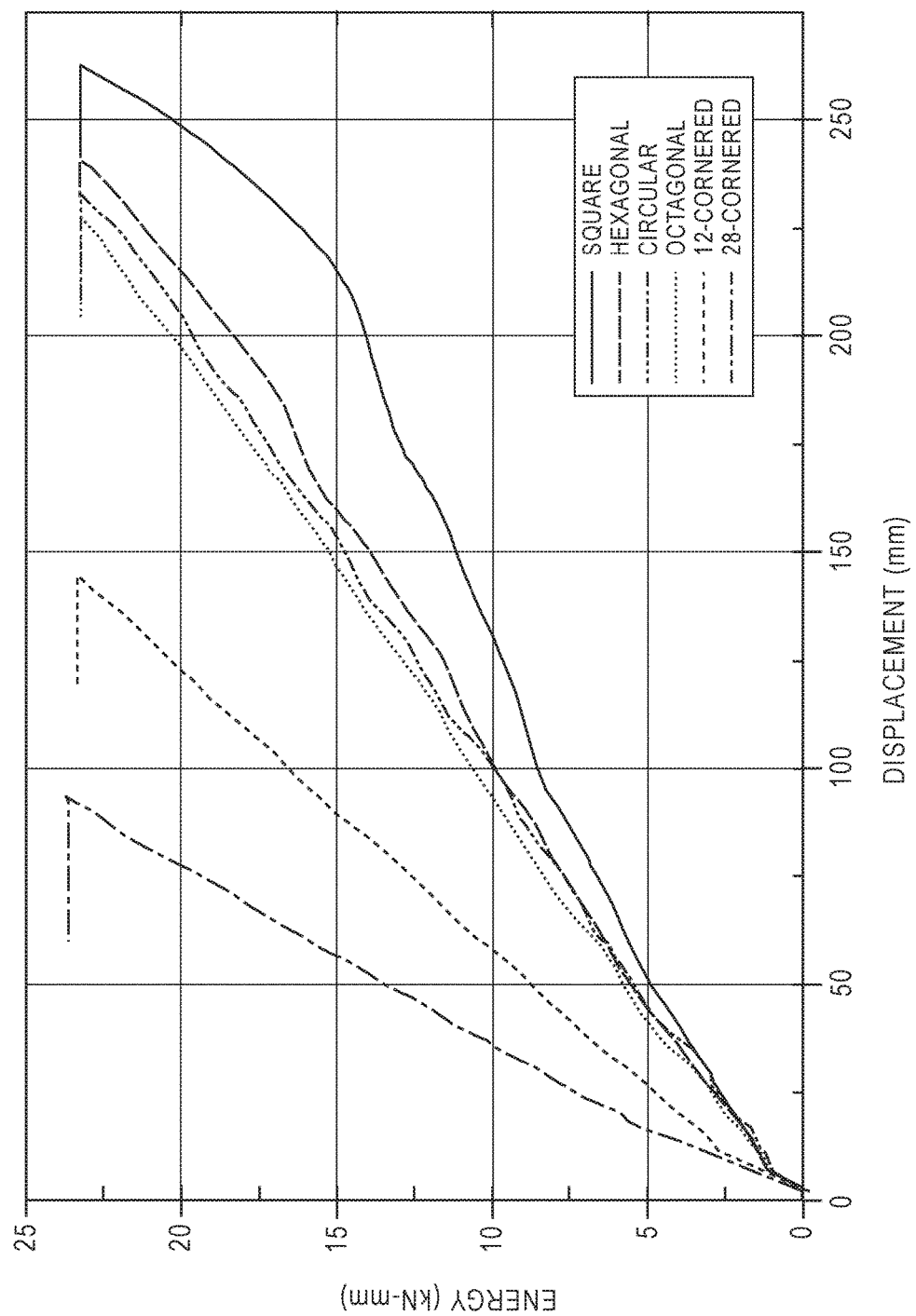
FIG. 13 is a graph of the dynamic axial crush energy and associated axial crush distance for the exemplary strengthening members shown in FIG. 9.

FIG. 13 illustrates the dynamic axial crush energy (in kN-mm) and associated axial crush distance (in mm) for a simulated dynamic crush exerted on the exemplary strengthening members shown in FIG. 9. As shown in FIG. 13, the strengthening member having a twenty-eight-cornered cross section could absorb the same total kinetic energy of the impact over a much shorter distance as compared with the square, hexagonal, circular, octagonal, and twelve-cornered cross sections. In particular, a twenty-eight-cornered cross section in accordance with the present teachings absorbed the full axial crush energy in about 40.8% of the axial crush distance as the basic octagonal cross section.

Twenty-eight-cornered cross sections in accordance with the present teachings may, therefore, allow improved impact energy management over, for example, basic polygonal strengthening member cross sections, by minimizing mass per unit length, thereby providing mass saving solutions that reduce vehicle weight and meet new corporate average fuel economy (CAFE) and emission standards.

Beyond the increased load carrying and energy absorption efficiency, strengthening members in accordance with the present teachings may provide additional advantages or benefits such as improved moisture shedding abilities (as noted above), increased bending energy absorption capacity, improved manufacturing feasibility, and better fitting of the shape amongst the other components of the complete device (e.g., vehicle, as noted above).

In addition, a twenty-eight-cornered strengthening member in accordance with the present teachings also may be tuned to accommodate unique packaging requirements for use in various vehicles. By virtue of the particular shape of the cross section of at least some of the twenty-eight-cornered strengthening members, it may be easier to couple, bond, attach, or otherwise affix other device components to the strengthening member. Other device components can include, but are not limited to, engine mounts or transmission mounts.

Twenty-eight-cornered strengthening members in accordance with the present teachings are contemplated for use as structural members in a number of environments. For example, in a motor vehicle, a strengthening member as disclosed herein may be used, for example, as one or more of crush cans, front rails, mid-rails, rear rails, side rails, shotguns, cross members, roof structures, beltline tubes, door beams, pillars, internal reinforcements, and other components that can benefit from increased crash energy absorption or the other advantages described herein. In addition, the present teachings can be applied to both body-on-frame and unitized vehicles, or other types of structures.

Figure 14:
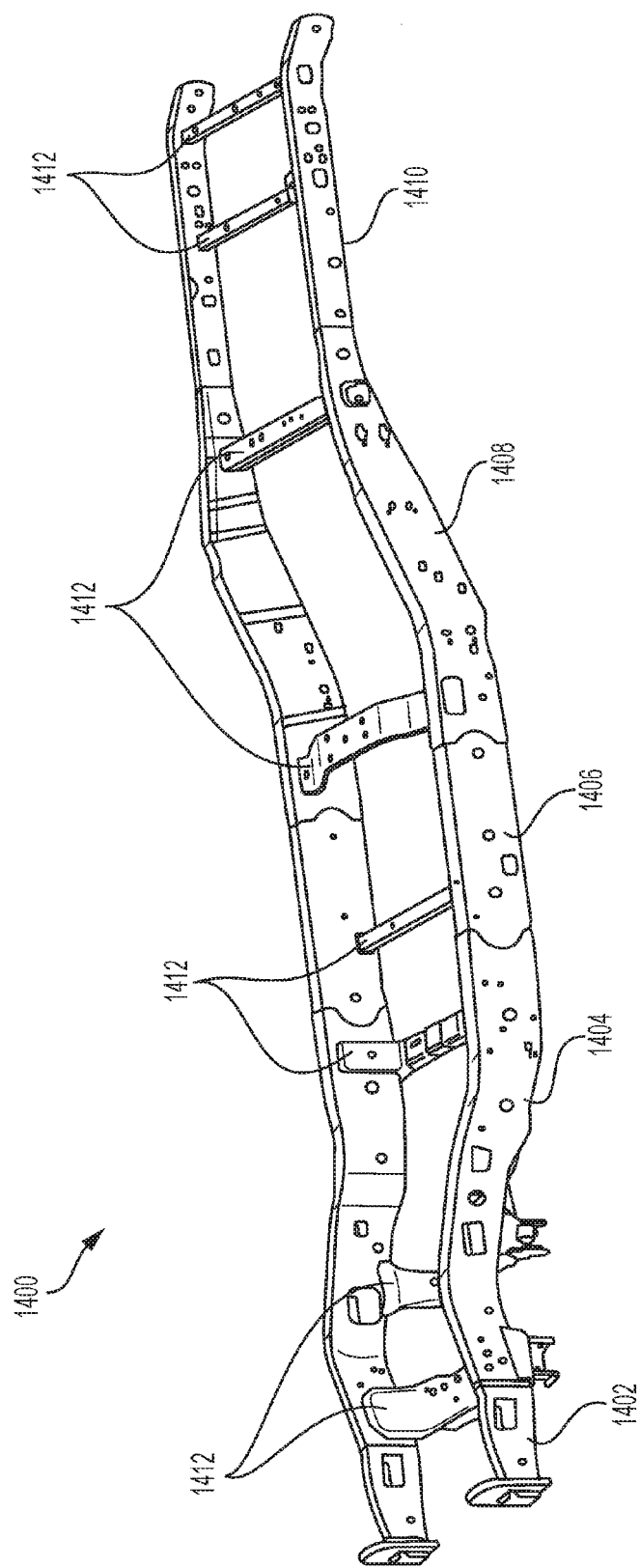
FIG. 14 is a perspective view of an exemplary embodiment of a vehicle frame having several components for which a strengthening member having a twenty-eight-cornered cross section with twenty internal angles and eight external angles can be used.
Figure 15:
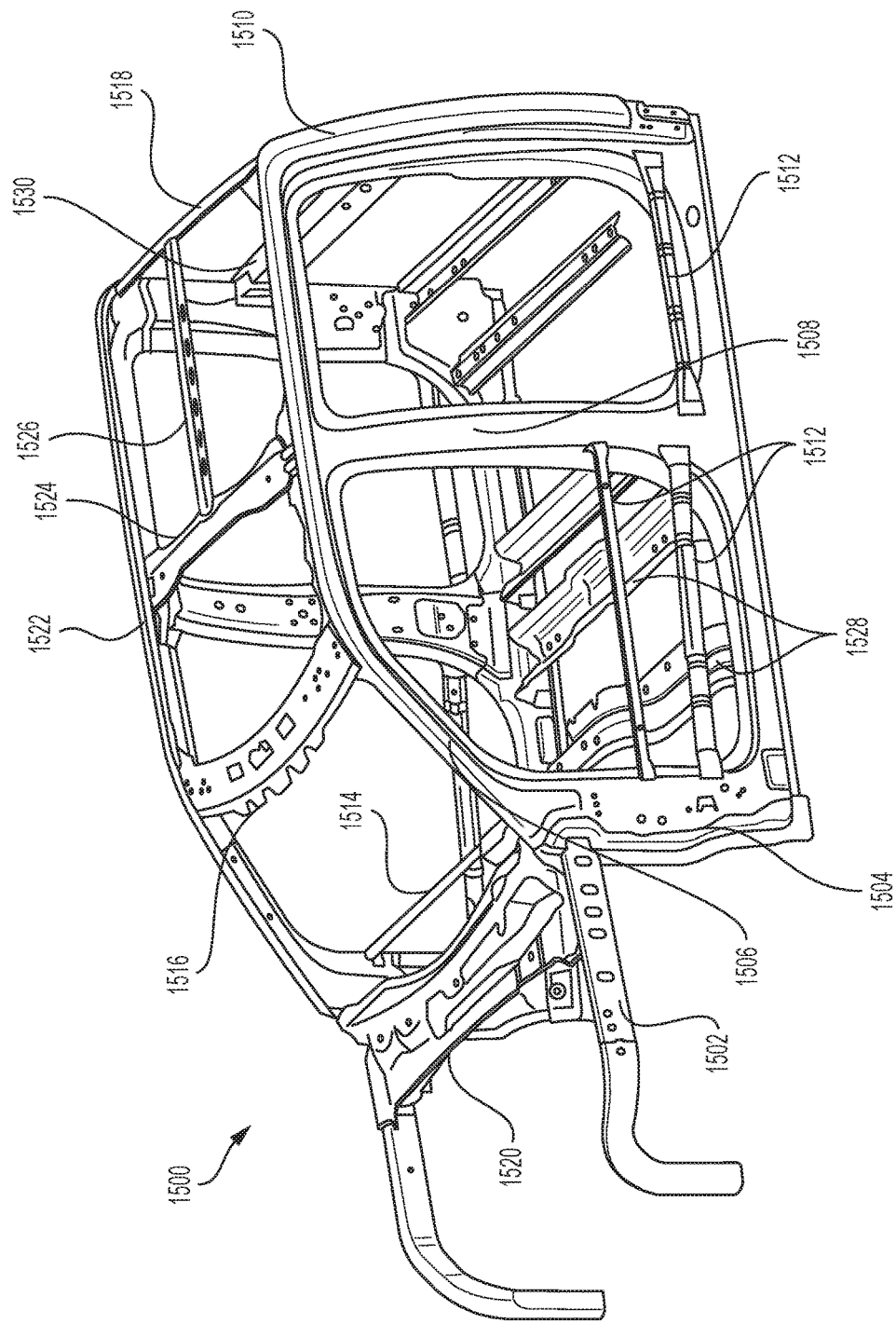
FIG. 15 is a perspective view of an exemplary embodiment of a vehicle upper body having several components for which a strengthening member having a twenty-eight-cornered cross section with twenty internal angles and eight external angles can be used.

For example, as shown in FIGS. 14 and 15, twenty-eight-cornered strengthening members with twenty internal angles and eight external angles in accordance with the present disclosure can be a part of or within a vehicle frame and/or a vehicle upper body. FIG. 14 illustrates an exemplary embodiment of a vehicle frame 1400 with several components for which the strengthening can be used. For example, the strengthening members in accordance with the present disclosure may form or be used as a part of a front horn 1402, a front rail 1404, a front side rail 1406, a rear side rail 1408, a rear rail 1410, and/or as one or more cross members 1412. Likewise, FIG. 15 illustrates an exemplary embodiment of a vehicle upper body 1500 with several components for which the strengthening can be used. For example, the strengthening members in accordance with the present disclosure may be formed or be used as a part of a shotgun 1502, a hinge-pillar 1504, an A-pillar 1506, a B-pillar 1508, a C-pillar 1510, one or more door beams 1512, a cross car beam 1514, a front header 1516, a rear header 1518, a cow top 1520, a roof rail 1522, a lateral roof bow 1524, longitudinal roof bow 1526, one or more body cross members 1528, and/or a body cross member 1530.

Moreover, the strengthening members in accordance with the present disclosure may be used as, or form a part of, a vehicle underbody component, for example, a rocker and/or one or more underbody cross members. Also, the strengthening members in accordance with the present disclosure may be used as or form a part of vehicle engine compartment components, for example, as one or more engine compartment cross members.

Depending on the application, embodiments of the present teachings will have varied shapes (i.e. various cross sections) to accommodate specific member space constraints. When used as a vehicle front rail, for example, to achieve optimized axial crush performance, the lengths and thicknesses of the sides and/or angles of the corners can all be adjusted (tuned) to provide optimal strength, size and shape to meet engine compartment constraints.

Although various exemplary embodiments described herein have been described as configured to be used with automotive vehicles (e.g., car, truck, van, ATV, RV, motorcycle, etc.), it is envisioned that the various strengthening members in accordance with the present teachings may be configured for use with other types of vehicles (e.g. aircrafts, spacecrafts and watercrafts) and/or structures, for which it may be desirable to provide increased crash energy absorption. Thus, it will be appreciated by those of ordinary skill in the art having the benefit of this disclosure that the present teachings provide strengthening members for various applications. Further modifications and alternative embodiments of various aspects of the present teachings will be apparent to those skilled in the art in view of this description.

It is to be understood that the particular examples and embodiments set forth herein are non-limiting, and modifications to structure, dimensions, materials, and methodologies may be made without departing from the scope of the present teachings.

In particular, those skilled in the art will appreciate that a strengthening member may include more than one longitudinal section or portion, with each section or portion having one or more of the variations taught in accordance with the present disclosure. Said variation(s) can be made continuously or intermittently along the length of each longitudinal section. In other words, strengthening members that embody combinations of one or more of the above variations to the disclosed tunable parameters, which have not been illustrated or explicitly described, are also contemplated.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the devices and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A strengthening member for a motor vehicle, comprising:
   twenty-eight sides arranged to create twenty internal angles and eight external angles.

2. The strengthening member of claim 1, wherein each internal angle ranges between about 45 degrees and about 175 degrees.

3. The strengthening member of claim 1, wherein each external angle ranges between about 45 degrees and about 175 degrees.

4. The strengthening member of claim 1, wherein:
   twelve of the twenty internal angles are substantially equal to one another; and
   the other eight of the twenty internal angles are substantially equal to one another.

5. The strengthening member of claim 1, wherein the eight external angles are substantially equal to one another.

6. The strengthening member of claim 1, wherein:
   twelve of the twenty internal angles are each substantially equal to a first angle size;
   the other eight of the twenty internal angles are each substantially equal to a second angle size;
   the eight external angles are each substantially equal to a third angle size; and
   the first angle size, the second angle size, and the third angle size are substantially different from one another.

7. The strengthening member of claim 1, wherein the strengthening member further comprises at least one recessed area extending along a length of the strengthening member.

8. The strengthening member of claim 7, wherein the at least one recessed area is defined by two internal angles and one external angle of the strengthening member.

9. The strengthening member of claim 8, wherein the two of the internal angles defining the recessed area differ from one another.

10. The strengthening member of claim 1, wherein the strengthening member further comprises eight recessed areas, wherein each recessed area extends along a length of the strengthening member from a first end of the strengthening member to a second end of the strengthening member.

11. The strengthening member of claim 7, wherein the at least one recessed area is defined by two sides of the strengthening member.

12. The strengthening member of claim 1, wherein a cross section of the strengthening member comprises four lobe portions and four protrusion portions.

13. The strengthening member of claim 12, wherein a recessed area extending along a length of the strengthening member is positioned between one of the four lobe portions and one of the four protrusion portions.

14. The strengthening member of claim 13, wherein a side of the lobe portion adjacent to the recessed area has a first cross-sectional length and a side of the protrusion portion adjacent to the recessed area has a second cross-sectional length different from the first cross-sectional length.

15. The strengthening member of claim 1, wherein each corner of the strengthening member has substantially the same thickness as each side of the strengthening member.

16. A strengthening member for a motor vehicle, comprising:
a cross section including twenty-eight corners and having twenty-eight sides arranged to create internal angles and external angles, wherein angles alternate in a pattern comprising three consecutive internal angles, one external angle, two additional consecutive internal angles, and one additional external angle.

17. The strengthening member of claim 16 further comprising a longitudinal axis, wherein the strengthening member tapers along the longitudinal axis.

18. The strengthening member of claim 16, wherein the cross section has more than two bisecting planes of symmetry.

19. The strengthening member of claim 16, wherein at least one internal angle of the cross section varies along at least a portion of a longitudinal length of the strengthening member.

20. The strengthening member of claim 16, wherein a thickness of at least one side of the strengthening member varies along at least a portion of a longitudinal length of the strengthening member.

21. The strengthening member of claim 16, wherein:
the three consecutive internal angles each have a first angle measurement;
the two additional consecutive internal angles each have a second angle measurement; and
the first angle measurement and the second angle measurement are different from one another.

22. The strengthening member of claim 16, wherein the one external angle is substantially equal to the one additional external angle.

23. A strengthening member for a motor vehicle, comprising:
twenty-eight sides; and
twenty-eight corners, wherein a cross section of the strengthening member includes four lobe portions and four protrusion portions.

24. The strengthening member of claim 23, wherein a recess that extends along a length of the strengthening member between one protrusion portion and one lobe portion.

25. The strengthening member of claim 24, wherein the strengthening member includes eight recesses extending along the length of the strengthening member, each recess positioned between one protrusion portion and one lobe portion of the strengthening member.

26. The strengthening member of claim 23, wherein the twenty-eight corners comprise twenty internal angles and eight external angles.

27. The strengthening member of claim 23, wherein each lobe portion is defined by four of the twenty-eight sides, and each protrusion portion is defined by three of the twenty-eight sides.

* * * * *